(12) United States Patent
Yoshino

(10) Patent No.: US 10,859,681 B2
(45) Date of Patent: Dec. 8, 2020

(54) CIRCUIT DEVICE, OBJECT DETECTING DEVICE, SENSING DEVICE, MOBILE OBJECT DEVICE AND OBJECT DETECTING DEVICE

(71) Applicant: Yuuta Yoshino, Kanagawa (JP)

(72) Inventor: Yuuta Yoshino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 606 days.

(21) Appl. No.: 15/621,106

(22) Filed: Jun. 13, 2017

(65) Prior Publication Data

US 2017/0356985 A1 Dec. 14, 2017

(30) Foreign Application Priority Data

Jun. 13, 2016 (JP) .................... 2016-116938

(51) Int. Cl.

| G01S 7/48 | (2006.01) |
|---|---|
| G01S 7/4865 | (2020.01) |
| G01S 17/42 | (2006.01) |
| G01S 7/4861 | (2020.01) |
| G01S 7/481 | (2006.01) |
| G01S 17/931 | (2020.01) |
| G01S 17/10 | (2020.01) |

(52) U.S. Cl.
CPC .......... *G01S 7/4865* (2013.01); *G01S 7/4817* (2013.01); *G01S 7/4861* (2013.01); *G01S 17/10* (2013.01); *G01S 17/42* (2013.01); *G01S 17/931* (2020.01)

(58) Field of Classification Search
CPC ......... G01C 3/08; G01S 7/484; G01S 7/4865; G01S 7/497
See application file for complete search history.

(56) References Cited

U.S. PATENT DOCUMENTS

| 2013/0278917 A1* | 10/2013 | Korekado ............... G01C 3/08 356/5.01 |
|---|---|---|
| 2015/0124238 A1 | 5/2015 | Sakai et al. |
| 2016/0261090 A1 | 9/2016 | Sakai et al. |
| 2016/0274233 A1 | 9/2016 | Maravelias |

FOREIGN PATENT DOCUMENTS

| JP | H09-318735 | 12/1997 |
| JP | 2001-124854 | 5/2001 |
| JP | 2010-002222 | 1/2010 |
| JP | 2015-165196 | 9/2015 |

* cited by examiner

*Primary Examiner* — Luke D Ratcliffe
(74) *Attorney, Agent, or Firm* — Oblon, McClelland, Maier & Neustadt, L.L.P.

(57) ABSTRACT

A circuit device comprising a first wiring, one end of which is connected to a signal source, a wiring portion having one end connected to the signal source and including at least one second wiring that generates a signal having a longer time delay than the first wiring connected to the signal source, and a measurement circuit, to which the other end of the first wiring and the other end of the second wiring are connected, to measure a transit time difference, which is a difference between a first transit time required for a signal from the signal source to pass through the first wiring and a second transit time required for the signal from the signal source to pass through the second wiring.

17 Claims, 15 Drawing Sheets

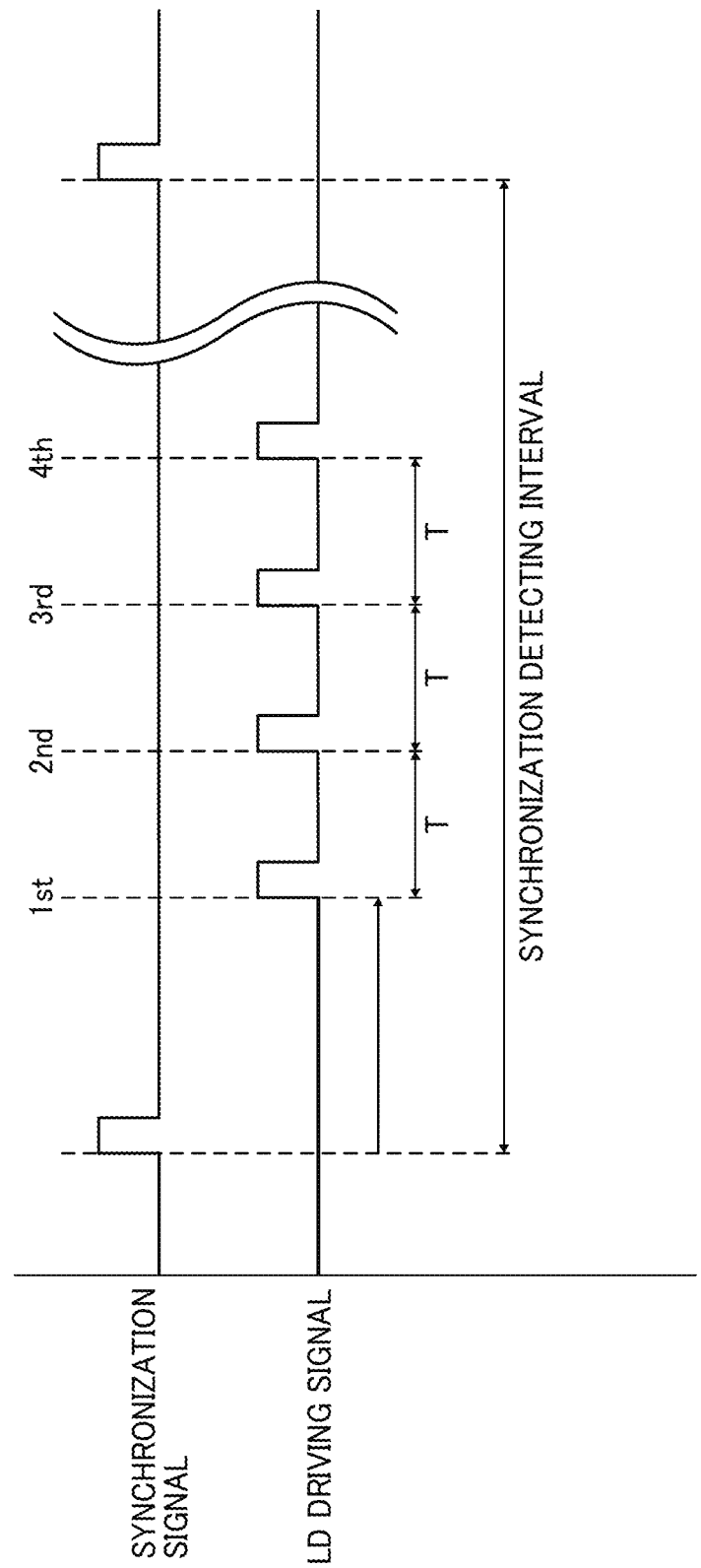

CIRCUIT DEVICE, OBJECT DETECTING DEVICE, SENSING DEVICE, MOBILE OBJECT DEVICE AND OBJECT DETECTING DEVICE

CROSS-REFERENCE TO RELATED APPLICATIONS

The present application claims priority to and incorporates by reference the entire contents of Japanese Patent Application No. 2016-116938 filed in Japan on Jun. 13, 2016.

BACKGROUND

1. Field

The present disclosure relates to an object detecting device, a sensing device, and a mobile object device, and more specifically relates to an object detecting device that detects whether there is an object and detects a distance to the object, a sensing device provided with the object detecting device, and a mobile object device provided with the object detecting device or the sensing device.

2. Description of the Related Art

Conventionally, a circuit is known that receives a first signal generated at a first timing and a second signal generated at a second timing later than the first timing and passed through wiring, and measures a time difference between the first timing and the input timing of the second signal. For example, see Japanese laid-open Patent Publication No. H09-318735 and Japanese laid-open Patent Publication No. 2001-124854.

However, in the conventional circuit, the time difference actually measured is slightly different from the time difference between the first and second timings, which are the original measurement targets. This deviation originates from the inability to obtain information on the time required for a signal to pass through the wiring.

SUMMARY

A circuit device includes a first wiring, one end of which is connected to a signal source, a wiring portion having one end connected to the signal source and including at least one second wiring that generates a signal having a longer time delay than the first wiring connected to the signal source, and a measurement circuit, to which the other end of the first wiring and the other end of the second wiring are connected, to measure a transit time difference, which is a difference between a first transit time required for a signal from the signal source to pass through the first wiring and a second transit time required for the signal from the signal source to pass through the second wiring.

The above and other objects, features, advantages and technical and industrial significance of this invention will be better understood by reading the following detailed description of the presently preferred embodiments, when considered in connection with the accompanying drawings.

BRIEF DESCRIPTION OF THE DRAWINGS

FIG. 3 is a timing chart illustrating a synchronization signal and an LD drive signal;

DETAILED DESCRIPTION OF THE PREFERRED EMBODIMENTS

A laser radar 100 as a scanning object detecting device in one embodiment is hereinafter described with reference to the drawings.

Figure 1:
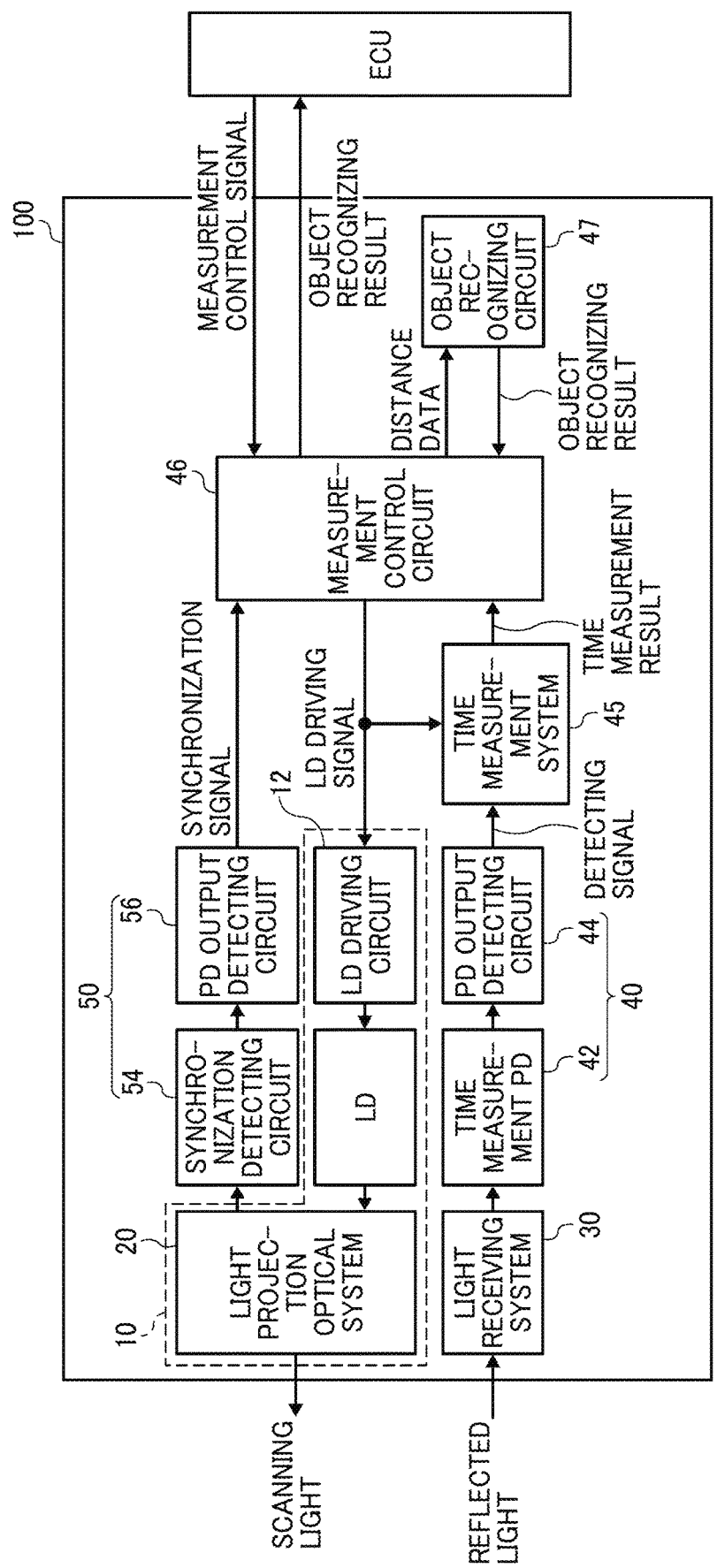
FIG. 1 is a view illustrating a schematic configuration of a laser radar in one embodiment.

FIG. 1 is a block diagram of a schematic configuration of the laser radar 100.

The laser radar 100 is a scanning laser radar mounted on an automobile, as a mobile object, for detecting whether there is an object (for example, a preceding vehicle, a stopping vehicle, an obstacle, a pedestrian, and the like) by emitting light and detecting a distance to the object by receiving reflected light (scattered light) from the object, as an example. The laser radar 100 is supplied with electricity from a battery (storage battery) of the automobile, for example.

The laser radar 100 is provided with a light projecting system 10, a light receiving optical system 30, a detection system 40, a time measurement system 45, a synchronization system 50, a measurement control circuit 46, and an object recognizing circuit 47, as illustrated at FIG. 1.

The light protecting system 10 includes an LD (laser diode), a LD driving circuit 12, and a light optical system 20.

The LD is sometimes called an Edge Emitting Laser (EEL). The LD is driven by the LD driving circuit 12 to emit laser light. The LD driving circuit 12 turns the LD on (allows the LD to emit light) when an LD driving signal (rectangular pulse signal) is input from the measurement control circuit 46. The measurement control circuit 46 includes a condenser to supply a current to the LD, a transistor to turn on/off between the LD and the condenser, and a charger to charge the transistor. The measurement control circuit starts or stops a measurement corresponding to a measurement control signal from an ECU (engine control unit) of the automobile.

Figure 2A:
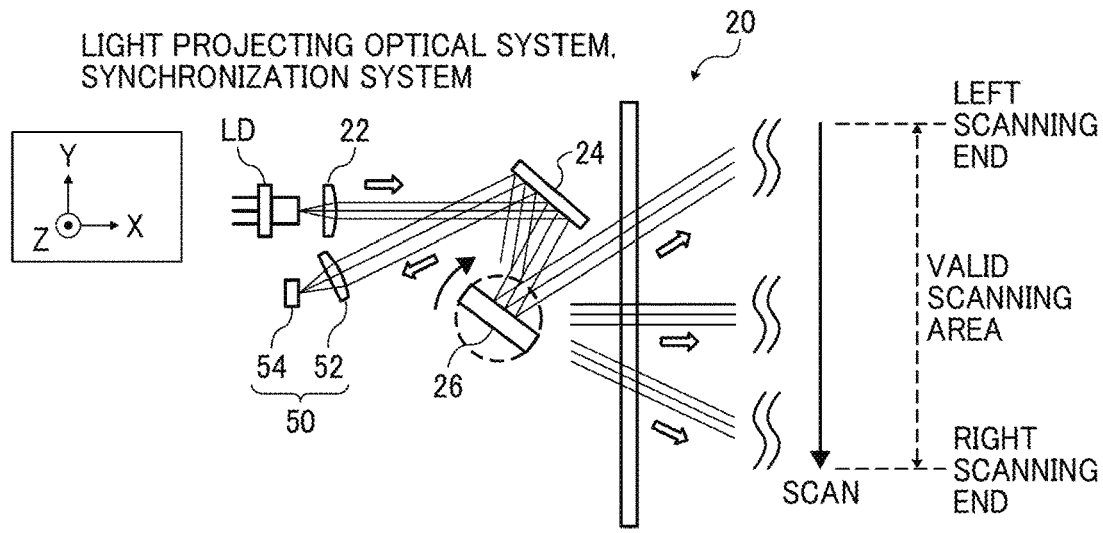
FIGS. 2A-2C are views for illustrating a Light projecting optical system and a synchronization system (A), illustrating a light receiving optical system (B), and schematically illustrating an optical path of light from an LD to a reflecting mirror and the optical path of the light from the reflecting mirror to a PD (C)
Figure 2B:
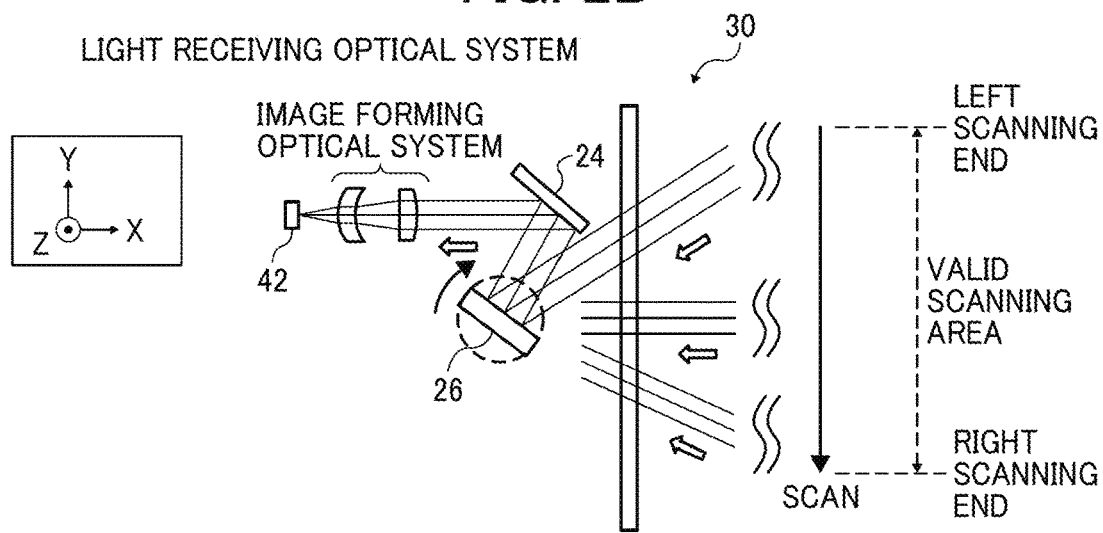

FIG. 2A schematically illustrates the light projecting optical system 20 and the synchronization system 50. FIG. 2B schematically illustrates the light receiving optical system 30. It is hereinafter described with appropriate reference to an XYZ three-dimensional orthogonal coordinate system in which a Z-axis direction is the vertical direction illustrated in FIG. 2A.

The light projecting optical system 20 includes a coupling lens 22 arranged on an optical path of the light from the LD, a reflecting mirror 24 arranged on the optical path of the light through the coupling lens 22, and a rotary mirror 26 as a deflector arranged on the optical path of the light reflected by the reflecting mirror 24, as illustrated in FIG. 2A. Herein, the reflecting mirror 24 is provided on the optical path between the coupling lens 22 and the rotary mirror 26 to turn the optical path, in order to obtain a compact device.

Therefore, the light emitted from the LD is shaped into the light having a predetermined beam profile by the coupling lens 22, and then reflected by the reflecting mirror 24 to be deflected about a Z-axis by the rotary mirror 26.

The light deflected in a predetermined deflection range about the Z-axis by the rotary mirror 26 is the light projected from the light projecting optical system 20, that is to say, the light emitted from the laser radar 100.

The rotary mirror 26 includes a reflecting surface that reflects (deflects) the light from the reflecting mirror 24 while rotating about a rotary axis (Z-axis), thereby scanning a valid scanning area corresponding to the above-described deflection range in a main-scanning direction, which is a horizontal uniaxial direction (herein, Y-axis direction) by the light.

Although the rotary mirror 26 includes two reflecting surfaces (two opposing surfaces) as is understood from FIG. 2A, there is no limitation on the number of surfaces, and one or three or more mirrors can be included. It is also possible to provide at least two reflecting surfaces and arrange them so that they are inclined at different angles with respect to the rotary axis of the rotary mirror, thereby changing the area to be scanned/detected in the Z-axis direction. The deflection range and the valid scanning area are herein arranged at a +X side of the laser radar 100. A direction of the rotary mirror 26 rotating is herein also referred as a "mirror rotation direction".

As illustrated in FIG. 2B, the light receiving optical system 30 includes the rotary mirror 26, which reflects the light projected from the light projecting optical system 20 and reflected (scattered) by the object located in the valid scanning area, the reflecting mirror 24, which reflects the light from the rotary mirror 26, and an image forming optical system arranged on the optical path of the light from the reflecting mirror 24, to form an image of the light on a PD (photodiode), as an optical detector to be described below.

In one embodiment, the projection optical system 20 and the light receiving optical system 30 are supported in the same housing. The housing includes an opening with a light transmitting member. The opening is arranged on the optical path of light from the light projection optical system 20 the light receiving optical system 30. The light transmitting member is, for example, made of glass or a polymer.

Figure 2C:
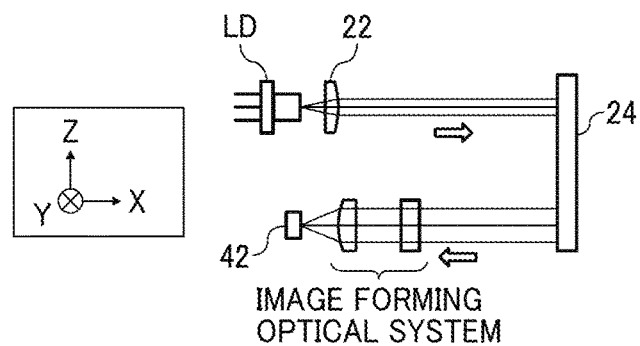

In FIG. 2C, the optical path extends from the LD to the reflecting mirror 24, and from the reflecting mirror 24 to the time measurement PD 42.

In FIG. 2C, the light projecting optical system 20 and light receiving optical system 30 are arranged to be overlapped in the Z-axis direction. Further, the rotary mirror 26 and the reflected mirror 24 are shared by the light projection optical system 20 and the light receiving optical system 30. Accordingly, it is possible to make a relative positional displacement between an irradiation range of the LD and a light receiving range of the PD on the object small, and realize stable object detection.

The detection system 40 includes the PD 42, which receives the light projected from the light projecting optical system 20 to be reflected (scattered) by the object located in the valid scanning area through the light receiving optical system 30 and a PD output detecting circuit 44, which detects a light reception signal of the PD, as illustrated in FIG. 2B and in FIG. 1.

The light projected from the light projecting optical system 20 to be reflected (scattered) by the object is guided to the image forming optical system through the rotary mirror 26 and the reflecting mirror 24 to be concentrated on the PD by the image forming optical system, as shown in FIG. 2B. In FIG. 2B, the reflecting mirror 24 is provided between the rotary mirror 26 and the image forming optical system to turn the optical path in order to obtain a compact device. Although the image forming optical system is herein formed of two lenses, the image forming optical system can be formed of one lens or three or more lenses, or a mirror optical system can be used.

The synchronization system 50 includes a synchronization lens 52 arranged on the optical path of the light emitted from the LD to be reflected by the reflecting mirror 24 through the coupling lens 22, the light deflected by the rotary mirror 26 to be reflected again by the reflecting mirror 24, a synchronization detecting PD 54 arranged on the optical path of the light through the synchronization lens 52, and a PD output detecting circuit 56, which detects an output signal of the synchronization detecting PD 54, as illustrated in FIG. 2A and in FIG. 1.

In detail, the reflecting mirror 24 is arranged on an upstream side of the above-described deflection range in a rotary direction of the rotary mirror 26 and the light deflected to the upstream side of the above-described deflection range by the rotary mirror 26 enters the same. Then, the light deflected by the rotary mirror 26 to be reflected by the reflecting mirror 24 enters the synchronization detecting PD 54 through the synchronization lens 52.

Meanwhile, the reflecting mirror 24 can also be arranged on a downstream side of the above-described deflection range in the rotary direction of the rotary mirror 26. The synchronization system 50 can also be arranged on the optical path of the light deflected by the rotary mirror 26 to be reflected by the reflecting mirror 24.

A signal is output from the synchronization detecting PD 54 each time the light reflected by each reflecting surface of the rotary mirror 26 is received by the synchronization detecting PD 54. As a result, the signal is periodically output from the synchronization detecting PD 54 (FIG. 3).

By performing synchronous lighting for irradiating the synchronization detecting PD 54 with the light from the rotary mirror 26 in this manner, it becomes possible to obtain a rotation timing of the rotary mirror 26 based on light reception timing by the synchronization detecting PD 54.

Then, it is possible to optically scan the valid scanning area in the main-scanning direction by pulse lighting of the LDA after a lapse of a predetermined time after the synchronous lighting of the LDA. That is to say, it is possible to optically scan the valid scanning area in the main-scanning direction by the pulse lighting of the LDA in periods before and after the timing at which the synchronization detecting PD 54 is irradiated by the light.

Herein, it is possible to use an APD (avalanche photodiode), a SPAD (single photon avalanche diode) being a Geiger-mode APD, and the like in addition to the above-described PD (photodiode) as a light receiving element used for measuring time (measuring distance) and detecting synchronization. The APD and SPAD, which have a higher sensitivity than that of the PD, are advantageous in detection accuracy and detection distance.

When the PD output detecting circuit 56 detects a voltage signal (right receiving signal) based on an output current (photocurrent) of the synchronization detecting circuit 54, it outputs a synchronization signal to the measurement control circuit 46.

The PD output detecting circuit 56 converts the output current from the synchronism detection circuit 54 to a voltage signal by using a current-voltage converter, amplifies the voltage signal by using an amplification device, obtains a binarized signal by using a comparison device such as comparator comparing the amplified voltage signal with a threshold level, and outputs the binarized signal to the measurement control circuit 46 as the synchronization signal.

The measurement control circuit 46 generates the LD driving signal based on the synchronization signal from the PD output detecting circuit 56 and outputs the LD driving signal to the LD driving circuit 12 and the time measurement system 45.

Thus, the LD driving signal is a plus lighting signal (periodic plus signal) obtained by delaying the synchronization signal (FIG. 3).

When the PD output detecting circuit 44 detects the voltage signal (right receiving signal) based on the output current of the time measurement PD 42, it outputs a detecting signal to the time measurement system 45. The PD output detecting circuit is described below.

The time measurement system 45 measures a reciprocating time to the object based on a timing of the LD driving signal generated in the measurement control circuit 46 and a timing of the detecting signal inputted from the PD output detecting circuit 44, and outputs the reciprocating time to the measurement control circuit 46 as a time measurement result.

The measurement control circuit 46 calculates a reciprocating distance by converting the time measurement result from the time measurement circuit 45 to a distance, and outputs a half of the reciprocating distance to the object recognizing circuit 47 as distance data.

The object recognizing circuit 47 recognizes where the object is based on distance data acquired in one scan or a plurality of scans from the measurement control circuit 46, and outputs an object recognition result to the measurement control circuit 46. The measurement control circuit 46 transfers the object recognition result to the ECU.

The ECU performs steering control (e.g., automatic steering or automatic braking) based on the transferred object recognition result, for example.

Figure 4A:
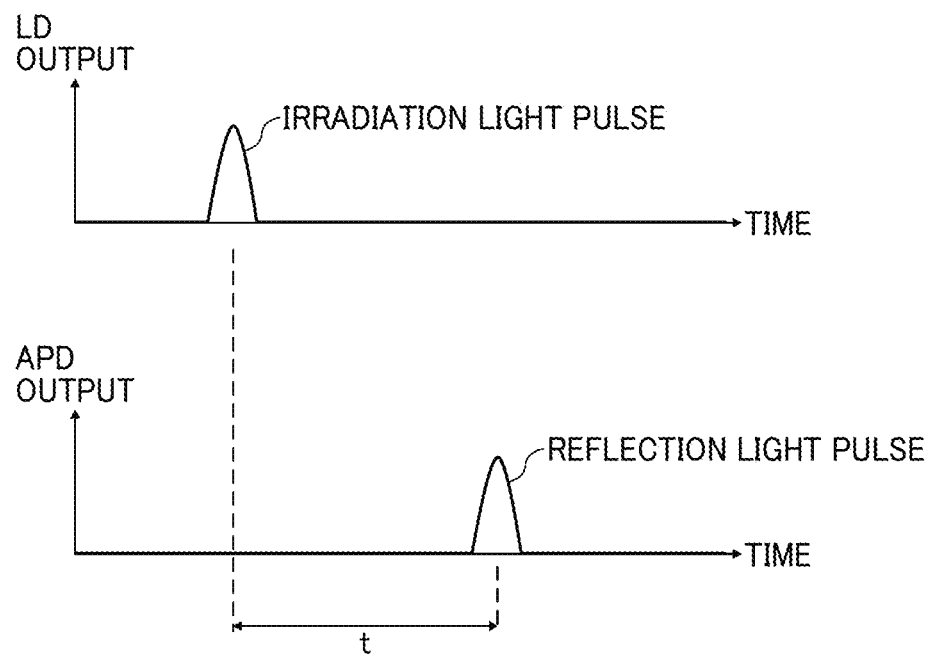
FIGS. 4A and 4B are timing charts illustrating an emitting pulse and a reflected pulse (A), and a timing chart illustrating a binary emitting pulse and a binary reflected pulse (B)

Herein, when the valid scanning area is scanned by the rotary mirror 26, the LD driving circuit 12 drives the LD to emit a pulsed light (hereinafter referred to as an "irradiation light pulse"), as illustrated in FIG. 4A. The time measurement PD 42 detects the pulsed light projected from the light irradiated from the LD to be reflected (scattered) by the object (hereinafter referred to as a "reflected pulse"). In FIG. 4A, an APD is used as a light receiving element instead of a PD.

It is possible to calculate the distance to the object by measuring the time t from when the LD emits the irradiation light pulse until when the reflected light pulse detected by the APD.

Figure 4B:
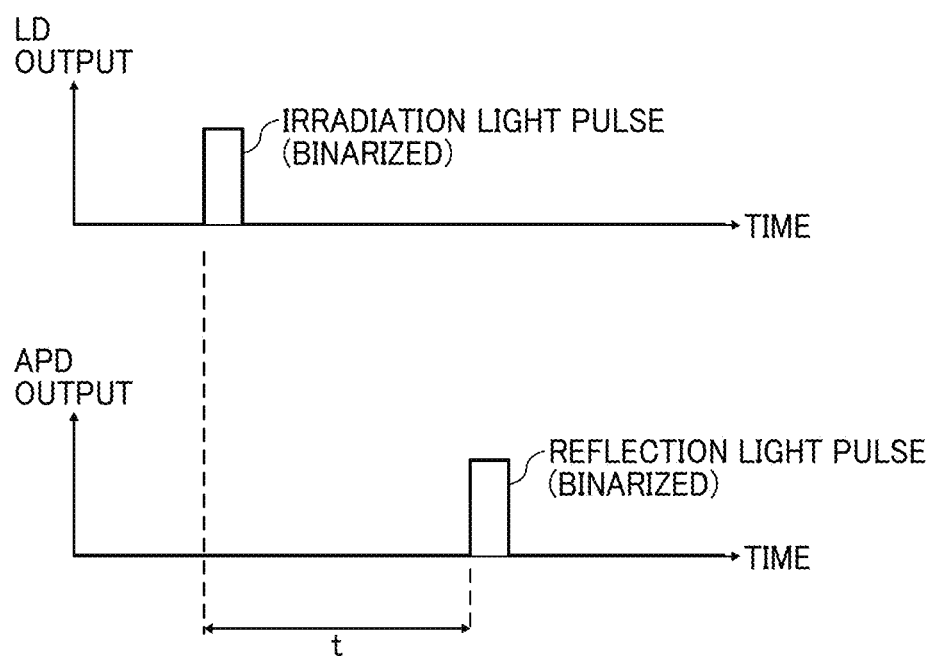

Regarding time measurement, for example, as shown in FIG. 4B, the irradiated light pulse is received by a light receiving element, such as a PD, and converted into a binary rectangular pulse, wherein the reflected light pulse is a rectangular pulse binarized by the PD output detecting circuit, and the time difference t between the rising timings of both the rectangular pulses can be measured by the time measuring circuit.

It is also possible to measure the time t by A/D converting the waveforms of the irradiation light pulse and the reflected light pulse, converting them into digital data, and calculating the correlation between the output signal of the LD and the output signal of the APD.

Figure 5:
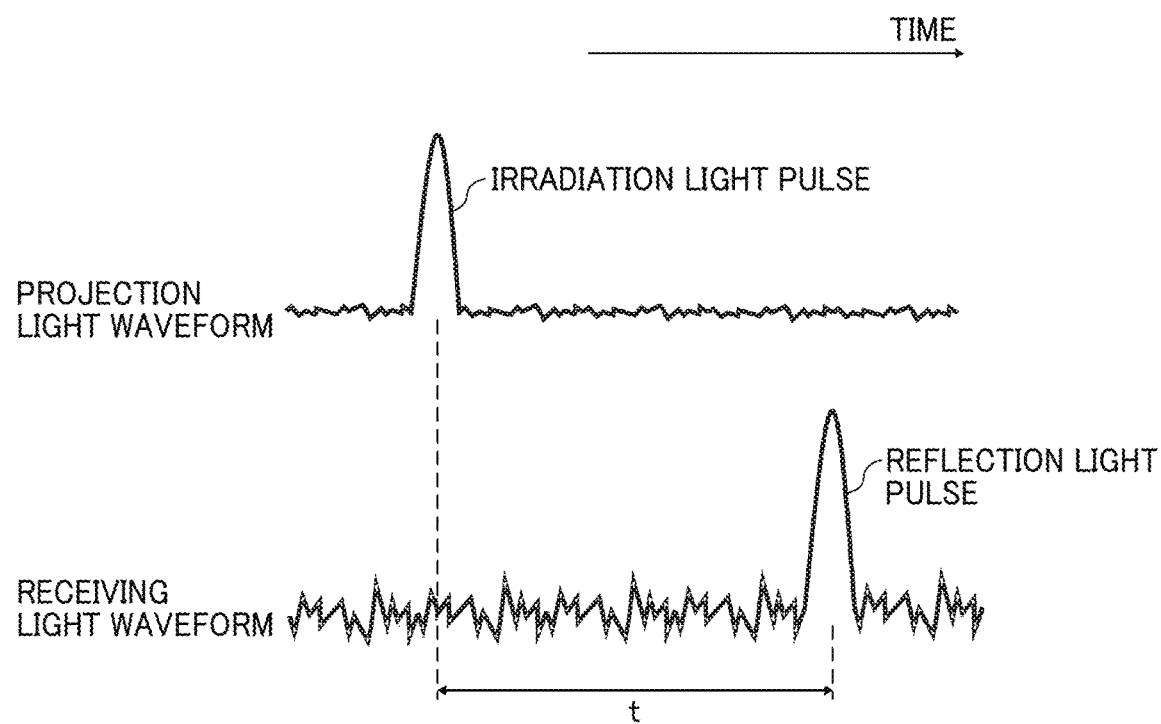
FIG. 5 is a view illustrating a Time-of-Flight (TCF) method.

As mentioned above, a so-called TOF (Time Of Flight) method is used as a method of time measurement in the present disclose (refer to FIG. 5).

In other words, in one embodiment, the LD driving circuit first makes the light source emit a light pulse. The pulse width of this pulsed light is from a few nanoseconds to a few tens of nanoseconds, for example. The pulsed light is projected via the right projection optical system 20, is reflected by the object, and enters the time measurement PD 42 through the light receiving optical system. At this time the photocurrent is output from the time measurement PD 42 to the PD output detection circuit 44.

As illustrated in FIG. 5, although the noise is small in the projected waveform, as reflected light from the object and scattered light are usually weak, the noise also increases in the received light waveform when amplified greatly with an amplifier, in general.

Figure 6:
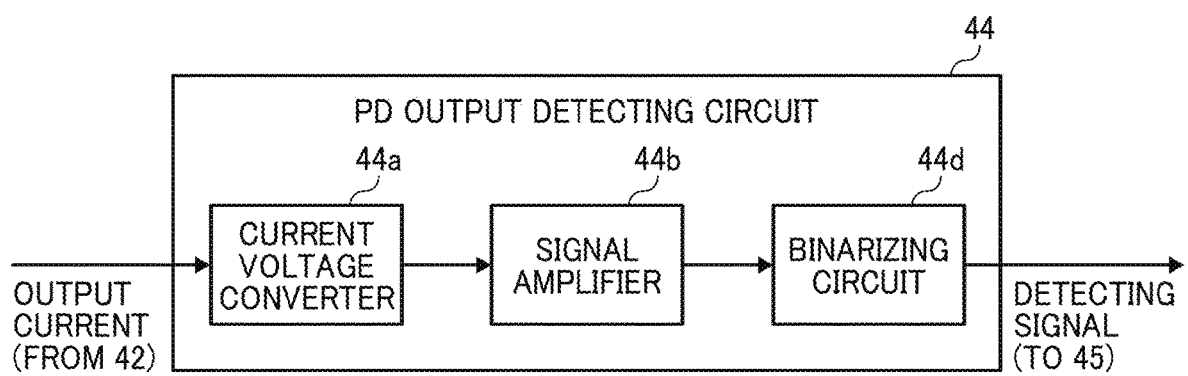
FIG. 6 is a view illustrating a schematic configuration of a PD output detecting circuit.

The configuration of the PD output detection circuit 44 of the detection circuit 40 is shown in the block diagram in FIG. 6.

As illustrated in FIG. 6, the PD output detection circuit 44 includes the current-voltage converter 44a, the signal amplifier 44b, and the binarizing circuit 44d.

The current-voltage converter 44a converts the output current from the time measurement PD 42 to a voltage signal (light receiving signal) and outputs it to the signal amplifier 44b.

The signal amplifier 44b amplifies and outputs the light receiving signal to the binary circuit 44d. The binarizing circuit binarizes the light receiving signal with a threshold and outputs a binarized signal to the time measurement system 45 as the detection signal.

As mentioned above, for distance measurement, a flight time measurement method is used to calculate the distance to the object, wherein the distance to the object is calculated from the time difference between the projected time and the time when reflected light is detected in an object detection device or the like.

Figure 7:
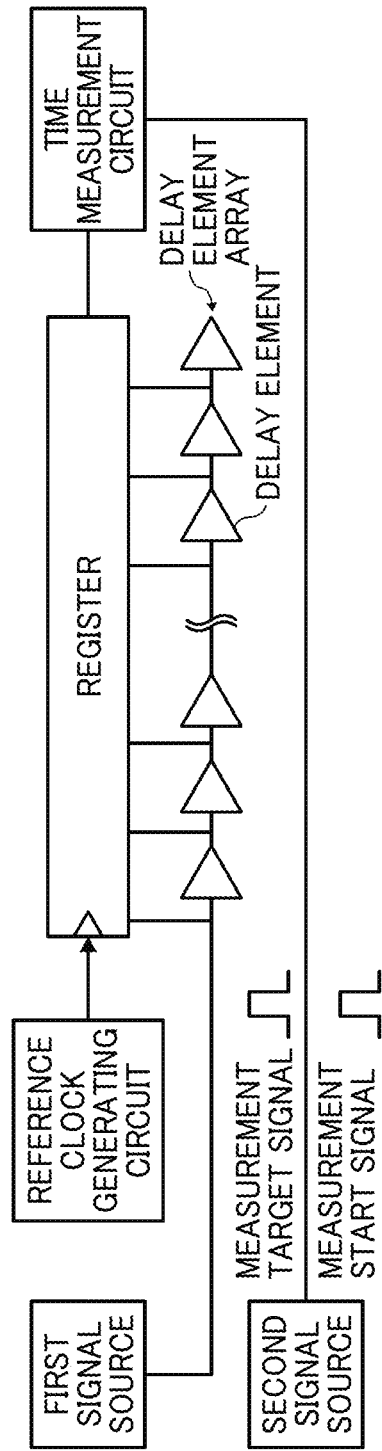
FIG. 7 is a view illustrating a comparative example.

In order to measure this time difference, it is common to include a delay element array to which the measurement target signal (detecting signal) is input, a register that reads the input signal level of the input measurement target signal input to the delay element array at high speed and a reference clock generator that generates a reference clock, as illustrated in FIG. 7 (comparative example).

The time measurement circuit of the comparative example is a circuit that measures the time difference between the generation timing of the measurement start signal and the input timing of the measurement target signal by the time measurement circuit.

A first signal generator (detection system) generates a signal to be measured, and a measurement start signal is generated by a second signal generator.

The measurement target signal is input to the delay element array in which N delay elements (first delay element to delay element N) are connected in series, and the input signal level of each delay element is read and held by a register in synchronization with the reference clock generated by the reference clock generating circuit.

The delay element to which the signal to be measured is input shows a high potential state "1", and the other delay element shows a low potential state "0".

In the time measurement circuit, the time difference is measured using the count number C of the reference clock when "1" is detected for the first time from the measurement start signal input time, the number M of the delay element that has transitioned "0" to "1", and the delay time D of one delay element using the formula C+(M*D).

In the time measuring circuit, using the count number C of the reference clock when "1" is detected for the first time from the input time of the measurement start signal, the number M of the delay elements that have transitioned from "0" to "1", and one delay element, the above time difference is measured by C+(M×D).

In the time measurement circuit of the comparative example, the time difference between the generation timing of the measurement start signal and the input timing of the measurement target signal includes, in addition to the time during which the light travels in the space, the electrical delay of the signal generated in the circuit of the detection system or in the time measurement circuit is included, and the delay time varies with temperature. For this reason, in order to improve the distance measurement accuracy, it is desired to appropriately correct the time difference between the generation timing of the measurement start signal and the input timing of the measurement target signal according to the delay time.

Therefore, the present inventor focused on the delay when passing through the wiring, for example in the detection system 40 and the time measurement system 45.

It is known that, within the wiring, the signal transmission speed is expressed as $v=c/\sqrt{\in}$ using the light speed c and the effective relative permittivity of the wiring $\in$. This value is a few picoseconds per 1 mm of wiring and is very small. The signal delay time due to the wiring is represented by L/v, with the length of the wiring being L.

However, the longer the wiring length, the more the wiring delay time is integrated, and sometimes added to such an extent as to be problematic for the distance measurement result.

Moreover, when the temperature in the circuit changes greatly, the wiring delay time fluctuates due to the wiring length and the change in the dielectric constant of the wiring material due to the temperature change, resulting in a variation in the distance measurement result. Factors affecting the temperature change in the circuit include a self-heating of the element in the circuit, and a change in ambient temperature around the circuit.

Therefore, in order to solve such a problem, the present inventor developed, as the time measurement system 45 circuit, devices 45A to 45H of Examples 1 to 8.

Figure 8:
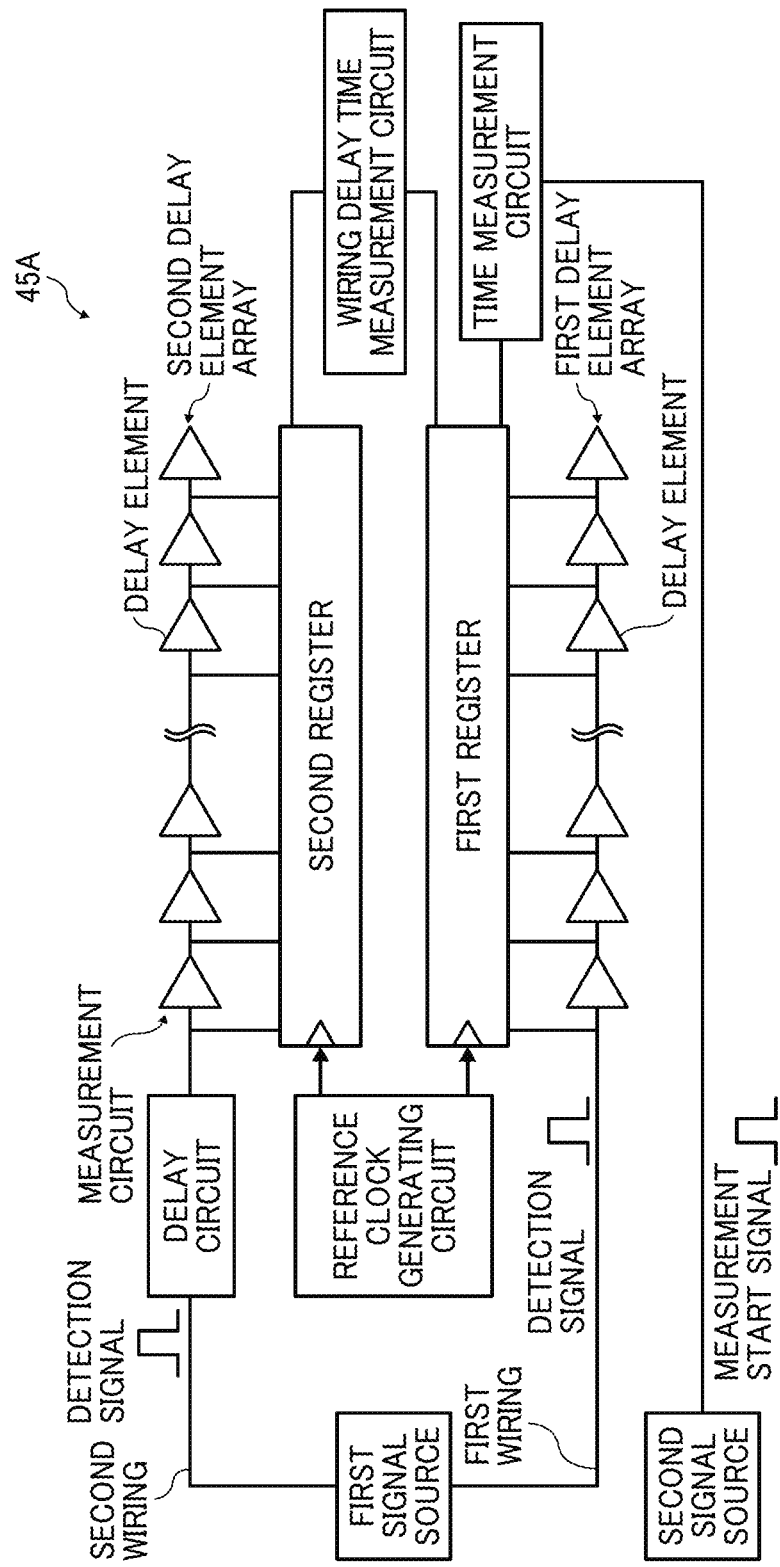
FIG. 8 is a view illustrating a circuit apparatus according to a first modification.

FIG. 8 shows the configuration of a circuit device 45A of the first embodiment.

The circuit device 45 includes a first wiring whose one end is connected to the first signal source (detection system 40), a first delay element array to which the other end of the first wiring is connected, a first register for reading the input signal level of the signal input to the first delay element array at a high speed, a second wiring having one end connected to the first signal source and giving a time delay greater than that of the first wiring to the input signal, a second delay element array connected to the other end of the second wiring, and a second register for reading the input signal level of the signal input to the second delay element array at a high speed.

In the circuit device 45A, the time measurement circuit connected to the second signal source and the second register generates the measurement start signal (LD drive signal) generated by the second signal source (measurement control circuit 46) at the generation timing and the first signal source. It is possible to obtain the time difference of the input timing of the measured object signal (detection signal). Examples of the delay element include a resistor, a capacitor, and the like.

In the circuit device 45A, the time measurement circuit connected to the second signal source and the second register can calculate the time difference between the timing of generation of the measurement start signal generated by the signal source and the input timing of the measurement target signal generated by the signal source. For example, as delay elements, registers, capacitors, and the like can be used.

The second wiring includes a wiring (hereinafter referred to as "wiring A") through which a signal as a source of a detection signal in the detection system 40 passes, a wiring through which a detection signal in the time measurement system 45 passes (hereinafter referred to as "wiring B"), and a delay path (wiring portion) for estimating a wiring delay time by a wiring (hereinafter referred to as "wiring C") connecting the detection system 40 and the time measurement system 45.

In the circuit device 45A, from the passing time difference, which is the difference between the first and second passing times required for the detection signal of the detection system 40 as the first signal source to pass through the first and second wirings, respectively (wiring delay time by delay path), the wiring delay time due to the wiring, the wiring delay time due to the wiring B, and the wiring delay time due to the wiring C can be obtained. The transit time difference substantially coincides with the time required for the detection signal to pass through the delay path.

In the circuit device 45A, the time measurement circuit measures the time difference Δt between the generation timing of the measurement start signal at the second signal source and the input timing of the detection signal passed through the first wiring and generated at the first signal source to the first delay element.

For the first wiring and the second wiring, a general conductive wire (jumper wire) can be used, or a pattern wiring printed on the substrate can be used. That is, a general conductive wire (jumper wire) can be used for the delay path, or a pattern wiring printed on the substrate can be used.

The circuit device 45A includes a wiring delay time measuring circuit that obtains the passing time difference of the signal (detection signal) from the first signal source from the outputs of the first register and the second register, and calculates a wiring delay time, which is a time required for a signal to pass through the wiring A, the wiring B, and the wiring C based on the passing time difference.

The measurement target of the wiring delay time measuring circuit can be the wiring delay time due to at least one of the wiring A, the wiring B, and the wiring C.

Although it is desirable to measure all wiring delay times by wiring A, wiring B, and wiring C, even if only the wiring delay time due to some wiring is measured, no wiring delay time is taken into consideration (not measured). It is possible to exclude the addition (wiring) of the wiring delay time from the time difference between the generation timing of the measurement start signal and the input timing of the measurement object signal.

Even when only the wiring delay time due to a part of the wiring is measured, as compared with the case where the wiring delay time is not taken into consideration, the additional amount of the wiring delay time calculated from the time difference between the generation timing of the measurement start signal and the input timing of the measurement target signal can be excluded.

The wiring A, for example, can include a wiring connecting the time measurement PD 42 and the current voltage converter 44a, a wiring connecting the current voltage converter 44a, and the signal amplifier 44b, and a wiring connecting the signal amplifier 44b and the binarization circuit 44d. The wiring B, for example, can include the first wiring. The wiring C can include a wiring connecting the binary circuit 44d and the first delay element array.

The length of the wiring to be measured out of the wiring A, the wiring B, and the wiring C is obtained beforehand, the delay time per unit length of the wiring of the delay path is obtained from the length of the wiring of the delay path and the wiring delay time due to the delay path, and the wiring delay time due to the wiring can be calculated from the delay time and the length of the wiring to be measured. Here, the wiring material used for the first wiring and the second wiring and the wiring to be measured is the same.

In this way, by measuring the wiring delay time by the wiring at any time in the wiring delay time measuring section, the wiring delay time due to the wiring according to the current temperature in the object detecting apparatus 100 can be obtained.

Then, by correcting the time difference Δt calculated by the time measuring section using the obtained wiring delay time, a more accurate time difference can be obtained, and in turn, a highly accurate distance measurement result can be obtained.

Figure 9:
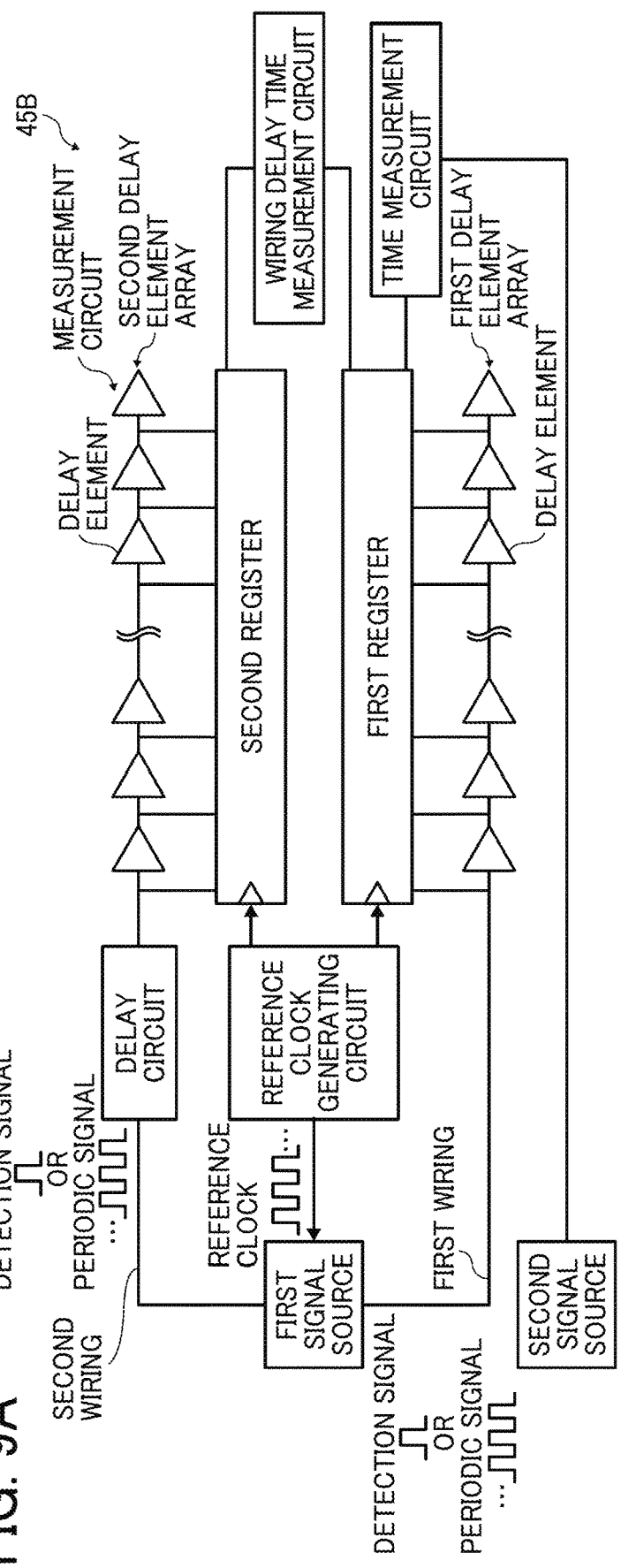
FIGS. 9A and 9B are views illustrating a circuit apparatus according to a second modification.

FIG. 9A shows the configuration of the circuit device 45B of a second embodiment. The circuit device 45B of the second embodiment has substantially the same configuration as the circuit device 4A of the first embodiment.

However, in the second embodiment, the first signal source includes the detection system 40 and a periodic signal generator for generating a periodic signal (a pulse signal including a plurality of periodically arranged pulses) at a timing different from the generation timing of the detection signal in the detection system 40.

In the second embodiment, the periodic signal synchronized with the reference clock, from which the first register and the second register are read, is designated as the first signal source, and are input to the first delay element array and the second delay element array. In this case, the transition from the low potential state "0" to the high potential state "1" occurs at a fixed position in each delay element array. At this time, when comparing the outputs of the first register and the second register, a difference occurs in the position of the delay element at which the transition is confirmed by the delay of the signal by the delay path with respect to the first wiring and the second wiring.

FIG. 9B shows a conceptual diagram of wiring delay time measurement in the second embodiment.

Here, it is assumed that the time of the high potential state of the periodic signal input to each delay element column is longer than the total delay time of the delay element string, but the case where the period is short is also effective as well.

The wiring delay time is calculated by $(I-j) \times D$ by using the transition position (delay element number) j in the delay element sequence at the time of passing through the delay path, the transition position (delay element number) i at the time of not passing the delay path, and the delay time D of one delay element. A known value may be used as the delay time of one delay element used for the calculation, or a value actually measured by the measuring circuit can be used. The "delay element number" is a number from 1 to N assigned in ascending order from the most upstream delay element to the most-downstream delay element in the delay element array.

Figure 10:
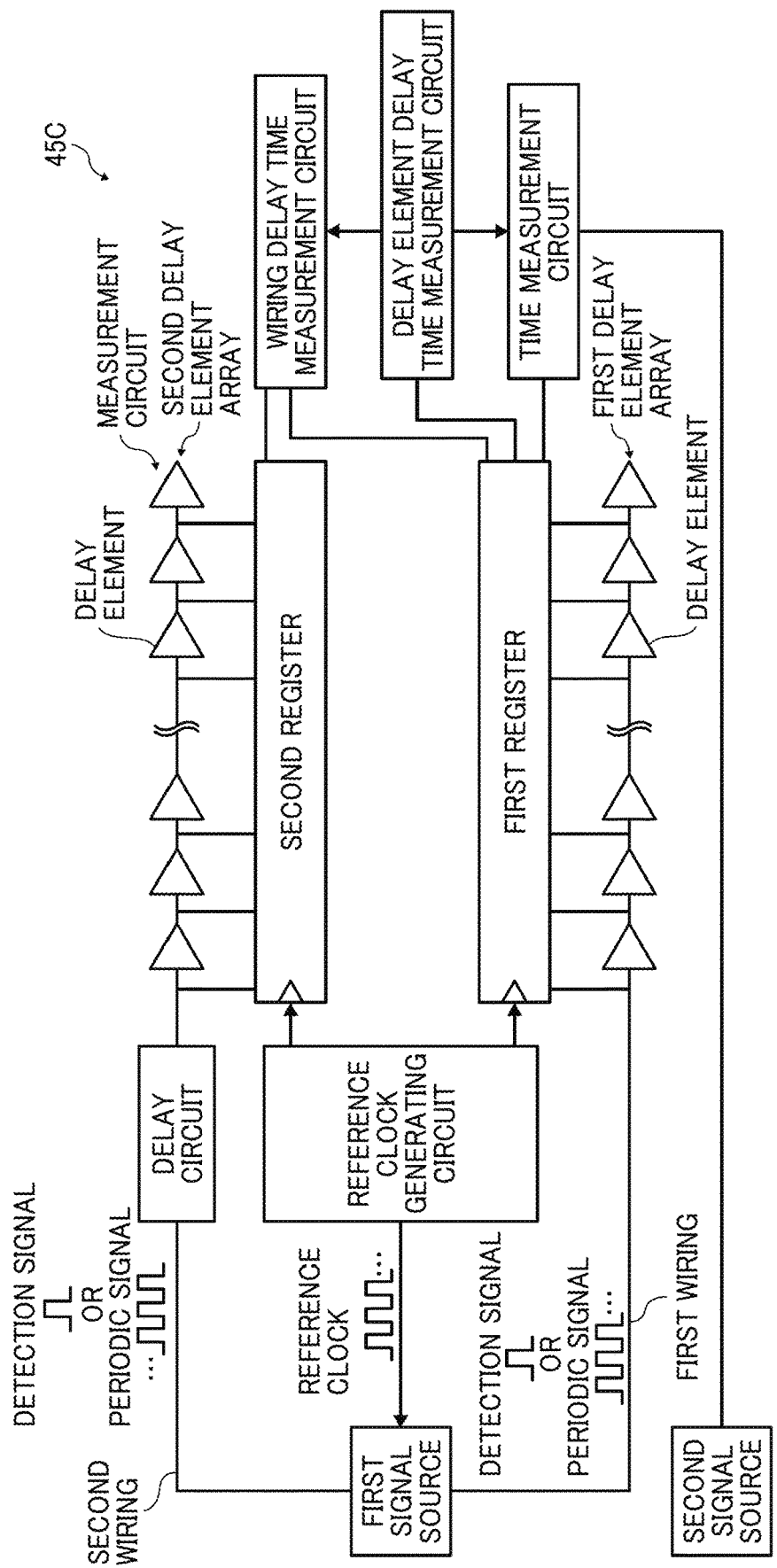
FIG. 10 is a view illustrating a circuit apparatus according to a third modification.

FIG. 10 shows a configuration of the circuit device 45C of a third embodiment. The circuit device 45C of the third embodiment has a configuration in which a delay element delay time measurement circuit is added to the circuit device 45B of the second embodiment.

Here, it is assumed that the periodic signal synchronized with the reference clock generated by the first signal source is shorter than the total delay time required to pass through the delay element array. In this case, two or more transitions from "0" to "1" in the delay element array are detected. At this time, assuming that two adjacent transition positions are i1 and i2, the interval between i1 and i2 coincides with the known period T in the periodic signal.

Therefore, in the third embodiment, the delay element delay time measuring circuit obtains the actual measurement value of the delay time of one delay element by calculating $(i2-i1)/T$. When constructing a circuit using an integrated circuit, it is difficult to know the delay time of one delay element, but it is possible in the third embodiment.

Then, the delay element delay time measuring circuit delivers the obtained measured value of the delay time of one delay element to the wiring delay time measuring circuit or the time measuring circuit.

Then, the delay element delay time measuring circuit delivers the obtained measured value of the delay time of one delay element to the wiring delay time measuring circuit and the time measuring circuit so that the time difference between the generation timing of the measurement start signal and the input timing of the measurement target signal, and wiring delay time can be accurately corrected.

Figure 11:
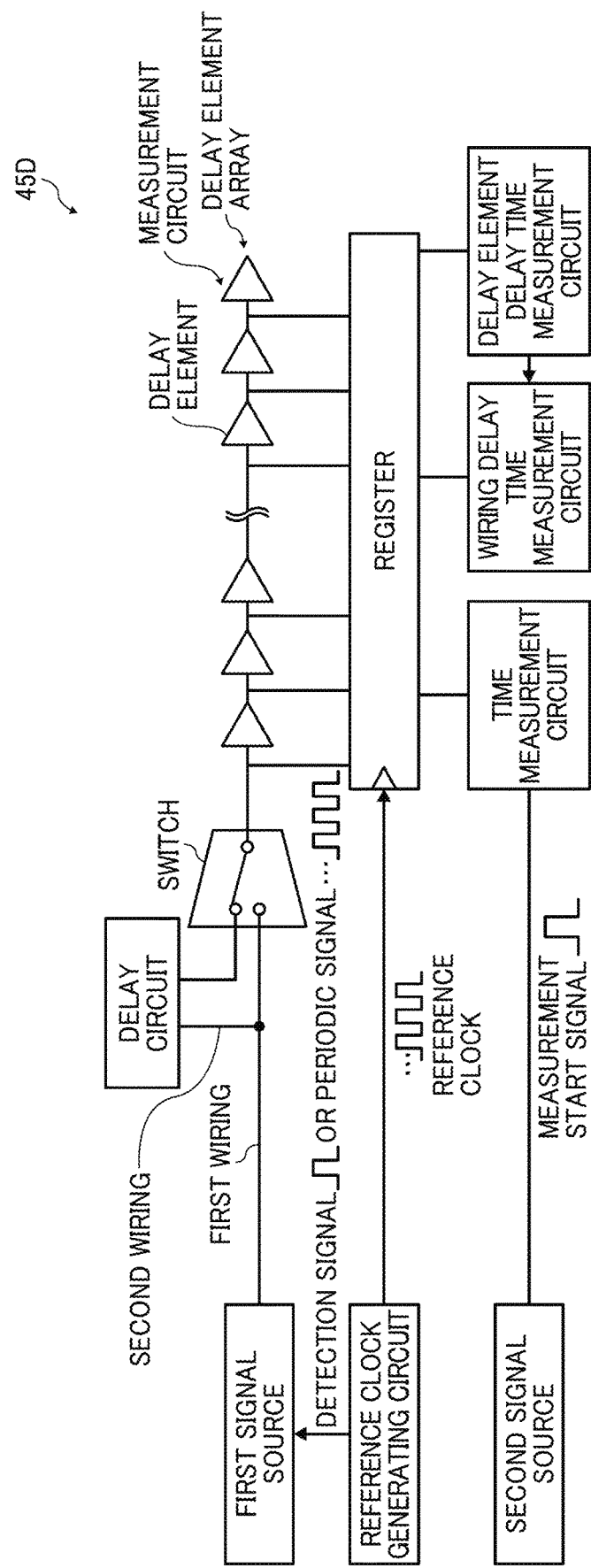
FIG. 11 is a view illustrating a circuit apparatus according to a fourth modification.

FIG. 11 shows a configuration of the circuit device 45D of a fourth embodiment.

The circuit device 45D of the fourth embodiment has a configuration in which the other ends of the first wiring and the second wiring whose one ends are connected to the first signal source generating the periodic signal synchronized with the reference clock are connected to the single delay element column by the switch. Other structures are substantially the same as those of the third embodiment.

The circuit device 45D of the fourth embodiment has a configuration in which the other end of the first wiring and the second wiring, one end of which is connected to the first signal source which generates the periodic signal synchronized with the reference clock, is selectively connected to a single delay element array by the switch, and the rest of the configuration is substantially the same as that of the third embodiment.

By adopting such a configuration, the circuit scale can be reduced, and by using the same delay prime number sequence, it is possible to reduce variations in the measurement of the individual difference.

In particular, by switching the switch at a cycle earlier than the temperature change, it is possible to carry out the measurement sufficiently following the temperature. When the temperature change is not a problem, the switching cycle of the switch does not have to be made earlier than the temperature change, and it may be arbitrarily set. The switching control of the switch is performed by a switch control circuit.

In addition, a temperature sensor can be provided in the object detection device 100, and monitoring and control can be performed so that the wiring delay time is measured when the change in the measured value (temperature change amount) in the temperature sensor exceeds a specified value. As the switch, an analog switch can be used, or a logic element such as a multiplexer in a digital circuit can be used.

Also, a known delay element delay time can be used without using the value actually measured by the delay element delay time measuring circuit.

The known delay element delay time can also be calculated by preparing a table of a plurality of delay times corresponding to a plurality of temperatures in advance, to provide a temperature sensor or the like in the object detection device 100 and to select the delay time by monitoring the temperature inside the object detection device 100.

In the first to fourth embodiments, by determining the number of delay elements N so as to be equal to or greater than the reference clock period, it is possible to stably measure the transition from the low potential state to the high potential state in the delay element array.

Figure 12:
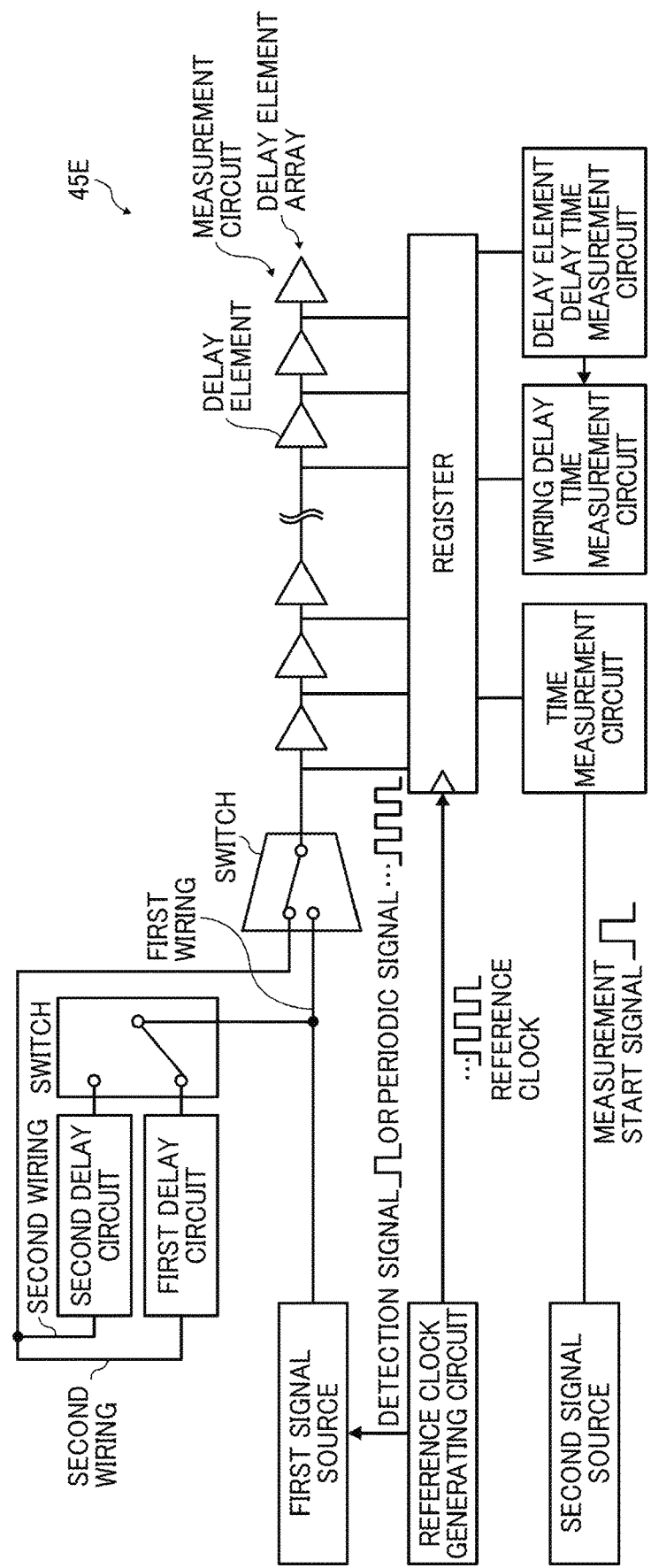
FIG. 12 is a view illustrating a circuit apparatus according to a fifth modification.

FIG. 12 shows a circuit device 45E of a fifth embodiment. The circuit device 45E of the fifth embodiment is different from the circuit device 45D of the fourth embodiment in that it includes a second wiring including the first delay path to the first signal source synchronized with the reference clock and a configuration in which the second wiring including the second delay path having the same wiring material and different wiring length from the first delay path is selectively connected by the switch.

When the wiring lengths of the first delay path and the second delay path are known, by comparing the results, when the signal passes through the first and second delay paths, it is possible to estimate the wiring delay time due to the difference between the wiring lengths of the first and second delay paths.

In the configuration of the fourth embodiment shown in FIG. 11, the difference in time required for the signals to pass through the first and second wires, respectively, is obtained. On the other hand, in the fifth embodiment, a passing time difference, which is a difference in transit time required for signals to pass through a plurality of (e.g., two) second wirings (hereinafter referred to as "passing time difference PT1"), a passing time difference, which is a difference in passage time during which the signal passes through the first wiring and the second wiring including the first delay path (hereinafter referred as "passing time difference PT2"), and a passing time difference, which is the difference between passing times when signals pass through the first wiring and the second wiring including the second delay path (Hereinafter referred to as "passage time difference PT3") can be obtained.

In this case, for example, the wiring delay time can be obtained by appropriately selecting from the transit time differences PT1, PT2, and PT3.

Further, by taking the average of at least two of the transit time differences PT1, PT2, PT3, it is possible to accurately obtain the wiring delay time.

It is preferable that the transit time difference PT1 is longer than the delay time of one delay element.

As the switch, an analog switch can be used, or a logic element such as a multiplexer in a digital circuit can be used. Also, a known delay element delay time can be used without using the value actually measured by the delay element delay measuring circuit. Switching control of the switch is performed by a switch control circuit.

The material of the plurality of second wirings can be partially or entirely different.

In this case, the ratio of the delay time of the second wiring of different material to the delay time of the other second wiring can be obtained.

If the material of the second wiring and the material of the first wiring are the same, the delay time per unit length of the wiring of the material can be obtained, and from the ratio of the delay time and the delay time, the delay time per unit length of the other second wiring can be obtained.

In addition to or instead of making the materials of the plurality of second wires partially or totally different, the lengths of the plurality of second wirings can be made different from each other.

In brief, it is possible to obtain the ratio of the wiring time due to the difference in material by using two wirings whose materials are partially or entirely different and whose lengths are the same, and it is possible to obtain the delay time per unit length of the wiring by using two wirings of the same material and different lengths.

Further, for example, a wiring (coupling wiring) in which a plurality of wirings having different materials are combined with at least one of the plurality of second wirings can be used. This is effective when such a coupling wiring is used for any of the wiring A, the wiring B, and the wiring C.

Specifically, for example, when at least two of the wirings A, B, and C are made of different materials, or at least one of the wirings A, B, and C is made of a different wiring material, it is possible to individually measure the wiring delay time for each material of the wiring.

In this case, from the viewpoint of using the transit time difference T1, it is preferable to make the lengths of the wires of the first delay path and the second delay path identical, and from the viewpoint of using the transit time differences T2 and T3, the wiring of the first delay path and the second delay path can be equal to each other or can be different from each other.

Figure 13:
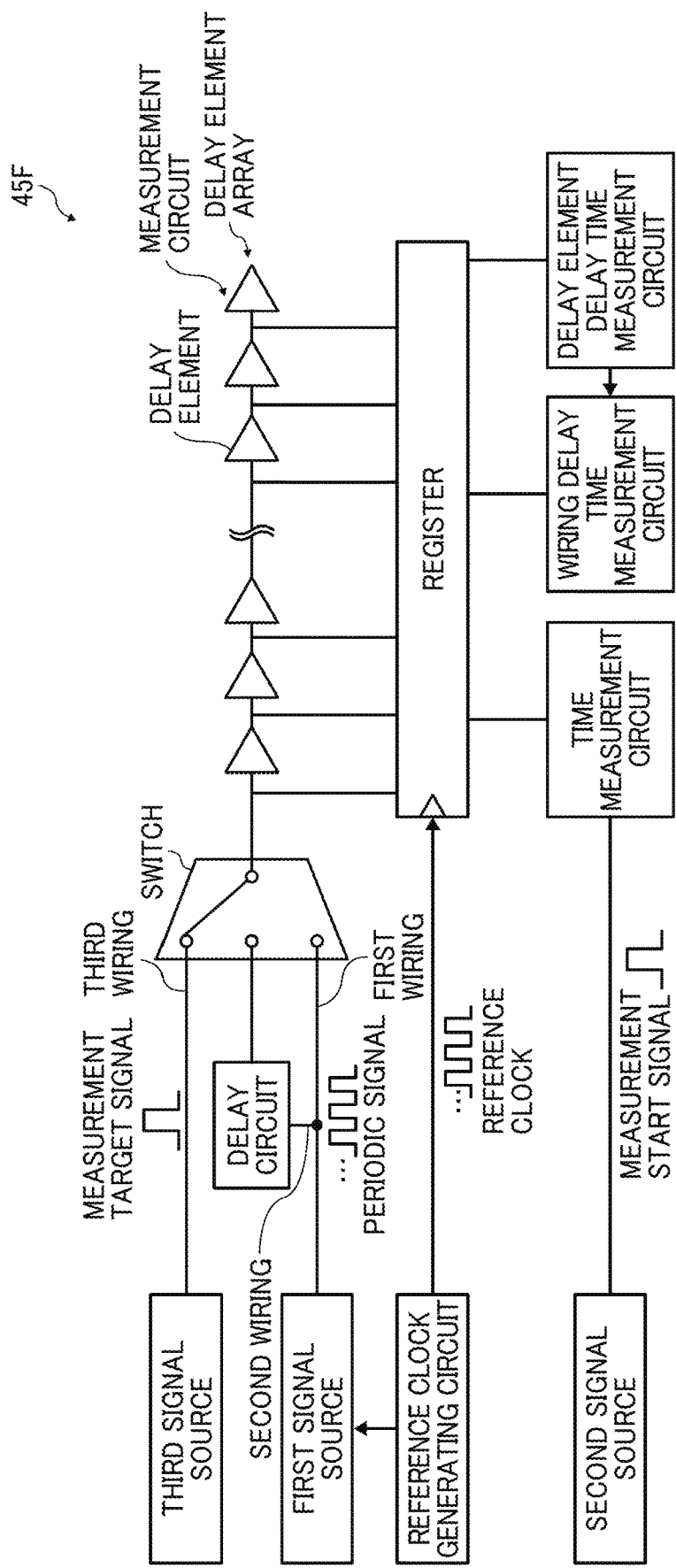
FIG. 13 is a view illustrating a circuit apparatus according to a sixth modification.

FIG. 13 shows a configuration of a circuit device 45F according to a sixth embodiment.

The circuit device 45F of the sixth embodiment is different from the circuit device 45D of the fourth embodiment in that it includes a configuration in which any one of the other ends of the first and second wirings, each one end of which is connected to the first signal source for generating a periodic signal synchronized with the reference clock and the other end of the third wiring whose one end is connected to the third signal source (detection system 40) that generates the measurement target signal is selectively connected to the delay element array by the switch.

As the switch, an analog switch can be used, or a logic element such as a multiplexer in a digital circuit can be used.

Also, a known delay element delay time can be used without using the value actually measured by the delay element delay time measuring circuit.

Further, in the circuit device 45F, the time measurement circuit calculates the difference Δt between the time when the measurement target signal is input to the delay element array from the measurement start time.

Here, in the time measuring circuit, the time difference Δt is measured by C+(M x D) using the count number C of the reference clock at the time when "1" is detected for the first time in the delay element array, from the low potential state, the number of the delay element that has transited to the high potential state, and the delay time D of one delay element. As the delay time D of one delay element, the value measured by the delay element delay time measuring circuit can be used, or a known value can be used. Also, it is not always necessary to measure the wiring delay time.

Figure 14:
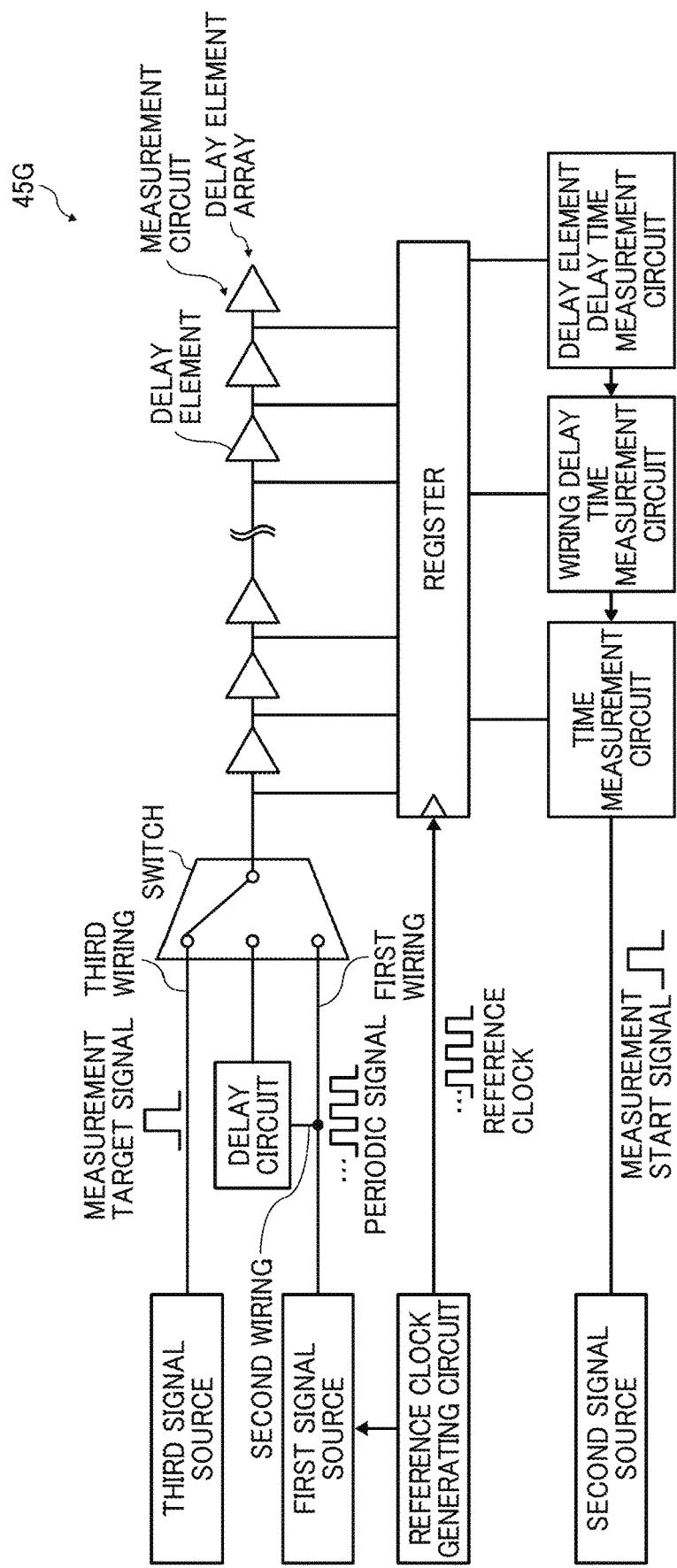
FIG. 14 is a view illustrating a circuit apparatus according to a seventh modification.

FIG. 14 shows a configuration of a circuit device 45G of a seventh embodiment. The circuit device 45G of the seventh embodiment is different from the circuit device 45F of the sixth embodiment in that the wiring delay time measuring circuit passes the wiring delay time calculated by the wiring delay time measuring circuit to the time measuring circuit and calculates Δt' by subtracting the wiring delay time from the time difference Δt.

The switching of the switch is preferably carried out at such a rate that it does not disturb the calculation at each measuring circuit.

Figure 15:
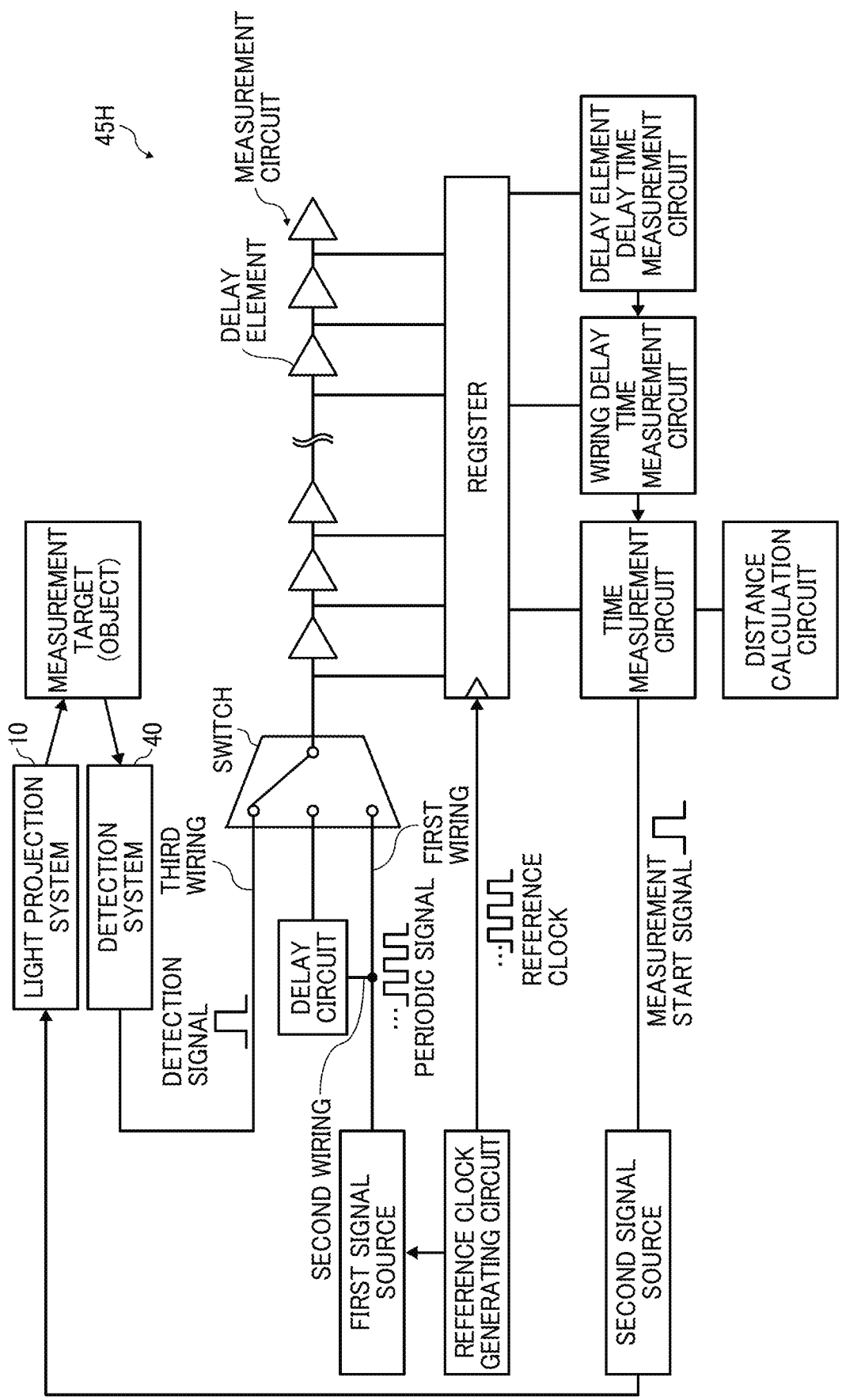
FIG. 15 is a view illustrating a distance detecting apparatus according to an eighth modification.

FIG. 15 shows a configuration of the distance measuring device 150 of an eighth embodiment. The distance measuring device 150 of the eighth embodiment has a configuration excluding the object recognizing circuit 47 from the object detecting device 100. The distance measuring device 150 has a circuit device 45H as a time measuring system 45. The circuit device 45H has a configuration in which a distance calculation circuit (a part of the measurement control circuit 46) is added to the circuit device 45G of the seventh embodiment.

In the circuit device 45H, as the signal source, the detection system 40 is connected to the delay element array via the switch. Switching control of the switch is appropriately performed by a switch control circuit. In FIG. 15, illustration of the light receiving optical system 30 is omitted.

In the distance measuring device 150, it is desirable that the timing of projecting light from the light projection system 10 and the timing of generating the measurement start signal coincide. The detection signal from the detection system 40 is sent to the switch to the delay element array as the measurement target signal.

At this time, using Δt' obtained by subtracting the wiring delay time td from the time difference Δt between the measurement start signal and the measurement object signal and the light speed c, the distance L to the measurement object can be calculated by L=c×Δt'/2. The distance calculation is performed by the distance calculation circuit. It is preferable that the light to be projected is in the form of a pulse.

In the circuit devices 45F to 45H of the above-described sixth to eighth embodiments, delay element arrays and registers are added and at least one of the first to third wirings is directly connected to the delay element string (connection without a switch). For example, when incrementing the delay element array and register one by one, one of the first to third wirings is directly connected to one of the delay element arrays, and the remaining two are selected by the switch to the other delay element array so as to be connected. In addition, for example, when two delay element arrays and two registers are added, the first to third wirings can be directly connected to three delay element arrays, respectively.

In the circuit devices 45A to 45H of the first to eighth embodiments, when no object is detected, for example, the measurement by the time measuring circuit is not performed.

In this case, in preparation for the detection of an object, only the wiring delay time can be measured, and the measurement result can be stored in a storage medium (memory or hard disk). At this time, it is preferable to carry out measurement periodically (with a relatively short period) and to update the measurement results. In this case, when an object is detected and the distance to the object is measured, it is not necessary to measure the wiring delay time, and the latest measurement result of the wiring delay time stored in the storage medium can be used for correcting the time difference between the generation timing of the measurement start signal and the input timing of the measurement target signal.

Hereinafter, a distance measuring method using the distance measuring device 150 of the eighth embodiment will be described with reference to FIG. 16.

Figure 16:
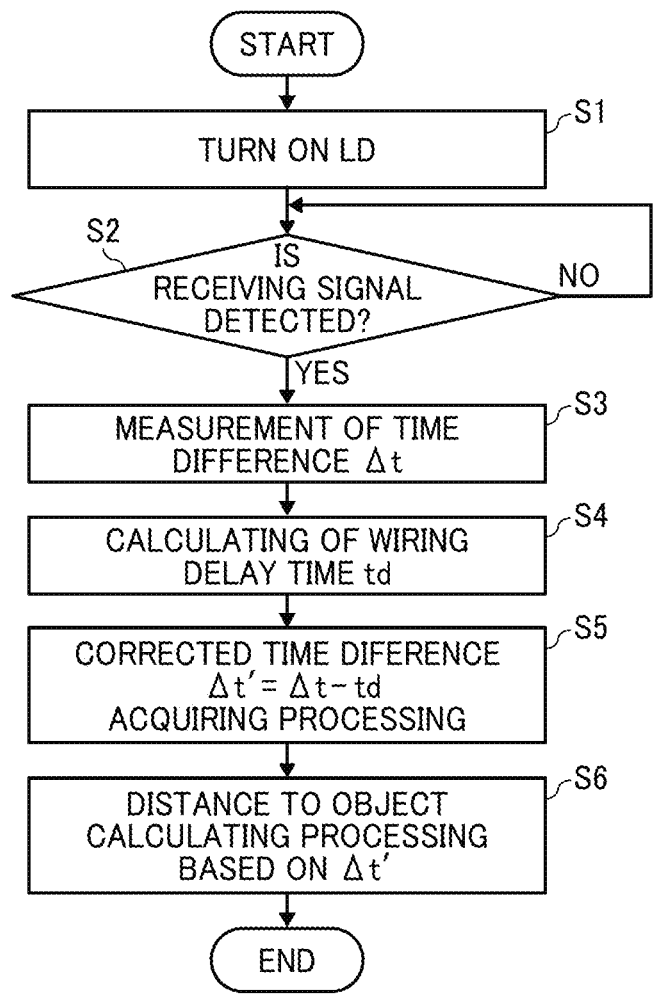
FIG. 16 is a view illustrating a distance detecting method according to a ninth modification.

The flowchart in FIG. 16 is based on the processing algorithm executed by the measurement control circuit 46 and the time measurement system 45 (circuit device 45H).

In the first step S1, the LD is turned on with the measurement start signal as a trigger.

In the next step S2, it is determined whether or not a light reception signal has been detected. Specifically, it is determined whether or not a binary signal as a detection signal is output as a measurement target signal from the binarization circuit 40d of the detection system 40. If the determination here is positive, the process proceeds to step S3, whereas if the determination is negative, it waits for the detection of the light reception signal.

In step S3, the time difference Δt between the generation timing of the measurement start signal and the input timing of the measurement target signal is measured.

In the next step S4, the wiring delay time td is calculated.
In the next step S5, Δt−td is obtained as the corrected time difference Δt'.

In the next step S6, the distance to the object is calculated based on Δt'.

The circuit device of the present embodiments described above (the circuit devices 45A to 45H of the first to eighth embodiments) includes the first wiring having one end connected to the first signal source, the wiring part having one end connected to the first signal source and including at least one second wiring that gives a signal having a longer time delay than the first wiring to the signal from the first signal source, and the measurement circuit to which the other end of the first wiring and the other end of the second wiring are connected to measure a passing time difference (wiring delay time), which is a difference between a first passing time and a second passing time required for a signal from the first signal source to pass through the first wiring and the second wiring.

In this case, the delay time of the signal by the wiring (wiring A) in the first signal source, the wiring (wiring B) in the measuring circuit, and the wiring (wiring C) connecting the first signal source and the measuring circuit can be obtained. Then, when the time difference between a first timing at which a reference signal (measurement start signal) is generated and a third timing at which the first signal source starts generating at a second timing later than the first timing and the signal passing through the wiring A, the wiring B, and the wiring C input to the measuring circuit is measured, and the time difference can be corrected using the delay time. That is, it is possible to accurately obtain the time difference between the first timing and the second timing, which is the original measurement target time.

According to the circuit device of the present embodiments, information on the time required for a signal to pass through the wiring can be obtained.

In a conventional time measuring circuit, the wiring delay time is added to the measured value, and there is an error from the actual measurement target time. In the present embodiments, it is possible to measure the amount to be added, and to measure the temperature change of the wiring delay time as well. As for the delay path of the second wiring, as long as it gives a delay to the input signal, the configuration is arbitrary, and it is possible to freely set and measure the material and the length.

Further, for example, by making the material of the first wiring and the second wiring the same, and making the lengths different from each other, the wiring delay time of the difference between the lengths of the first wiring and the second wiring can be obtained from the "passing time difference".

Also, the measurement circuit preferable includes a reference clock generation circuit for generating a reference clock, a delay circuit including a connection portion for connecting with at least one of the other end of the first wiring and the other end of the second wiring, and at least one delay element array including a plurality of delay elements connected in series for giving a time delay to an input signal, and a register circuit provided corresponding to the delay element array, including at least one register for reading and holding an input signal level when a signal is input to a delay element in synchronization with a reference clock.

In this case, it is possible to construct a configuration for measuring the "transit time difference" by using the configuration of a general time measuring circuit.

When the periodic signal, e.g., a pulse signal in which a plurality of pulses are consecutive at a constant period, output from a signal source in synchronization with a reference clock passes through the first wiring and is input to the delay element array, a delay element in which the input signal level transits from a low potential to high potential state is set as an i-th delay element counting from the upstream side, and
when the periodic signal passes through the second wiring and is input to the delay element array, a delay element in which the input signal level transits from the low potential state to the high potential state is set as the j-th delay element counting from the upstream side. The measurement circuit further includes a transit time difference calculation circuit (wiring delay time measurement circuit) that calculates a transit time difference from delay times of the (j+1)th to i-th delay element.

In this case, it is possible to measure the transit time difference with a high resolution corresponding to the delay time of the delay element.

The cycle of the periodic signal input to the delay element array is shorter than the time required for the periodic signal to pass through the delay element array, and the measuring circuit preferably further includes a delay element delay time calculating circuit (delay time calculating circuit) for calculating the delay time (delay element delay time) of one delay element from the number of delay elements per one cycle of the periodic signal.

It is known that the delay time of the delay element varies with temperature change, but the delay element delay time calculation circuit can determine the delay time of the delay element in real time. In the measuring circuit, the delay time of the delay element can also be used for measurement of the wiring delay time and time difference measurement which is a basic function, and it is also possible to correct the arithmetic expression used for these measurements.

It is preferable that the connecting portion includes a switch device that selectively connects one of the other ends of the first and second wirings to the delay element array.

In this case, the circuit size can be reduced. Further, since the wiring delay time and the delay element delay time can be measured using the same delay element array, it is possible to reduce the influence of the variation of the delay time due to the individual difference of the delay elements.

The delay circuit can include a first delay element column connected to the other end of the first wiring and a second delay element column connected to the other end of the second wiring.

In this case, since there is a delay element array corresponding to each wiring, there is no need to provide a switch device.

Also, it is preferable that the time required for passing through the delay element array is equal to or longer than the period of the reference clock.

In this case, it is possible to certainly detect the rising edge of the signal to be measured (transition from the low potential state to the high potential state) in the delay element array.

Further, it is preferably that the wiring portion includes a plurality of second wirings having different lengths, and the circuit device further includes a switch device for selectively connecting any one of the other ends of the plurality of second wirings to the first signal source.

In this case, it is possible to obtain the wiring delay time by taking the difference of the time (delay time) during which the signals respectively pass through the plurality of second wirings having different lengths.

Then, an average of the time obtained by dividing the time required for the signal to pass through each of the plurality of second wirings by the length of the second wiring and a plurality of differences obtained by taking the difference between the time taken for the signal to pass through the first wiring and the time taken for the signal to pass through the first wiring can be used as the wiring delay time. In this case, the wiring delay time can be obtained more accurately.

The circuit device further includes a plurality of second wirings, which are partially or entirely different in material, and further includes a switch device for selectively connecting any one of the other ends of the plurality of second wirings to the first signal source.

In this case, even if wiring of a plurality of kinds of materials is used for the circuit such as the first signal source, by preparing the second wiring of the plurality of kinds of materials, it is possible to accurately obtain the wiring delay time in the circuit.

In addition, in the circuit device of this embodiment, a measurement start signal for starting the distance measurement by the TOF method is generated by the second signal source, and one end is connected to a third signal source that generates a detection signal by the TOF method as a measurement object signal and the other end of the third interconnect, which has been connected, can be connected to the measuring circuit. The circuit device further includes the time measuring circuit connected to the measuring circuit, and calculating the time difference $\Delta t$ between the generation timing of the measurement start signal and the input timing of the measurement object signal.

It is possible to accurately determine the time difference between the generation timing of the measurement start signal and the generation timing of the measurement target signal, which is the original measurement target, by using the measurement circuit that measures wiring delay time and delay element delay time.

It is preferable to further include a switch device for selectively connecting any one of the other ends of the first to third wirings to the delay portion.

In this case, the circuit size can be reduced. Further, since the wiring delay time, the delay element delay time and the time difference Δt can be measured using the same delay element array, it is possible to reduce the influence of the variation of the delay time due to the individual difference of the delay elements.

The time measuring circuit preferably calculates a time t1 required for a signal to pass through the wiring in the third signal source based on the passing time difference and corrects the time difference Δt using the time t1.

In this case, it is possible to accurately obtain the time difference between the generation timing of the measurement start signal and the generation timing of the measurement target signal.

It is preferable that the time measurement circuit calculates the time t2 required for the signal to pass through the third wiring connecting the third signal source and the measurement circuit based on the passing time difference, and corrects the time difference Δ using the time t2.

In this case, it is possible to accurately obtain the time difference between the generation timing of the measurement start signal and the generation timing of the measurement target signal.

The circuit device of the present embodiment preferably further includes a distance calculation circuit that calculates the distance to the object irradiated by the light projected at the timing when the measurement start signal is generated based on the output of the time measurement circuit.

In this case, it is possible to calculate the distance to the object with high accuracy.

Further, according to the distance measuring apparatus including the circuit device of the present embodiments, the projection system 10 for protecting light at the timing when the measurement start signal is generated, and the detection system 40 serving as a signal source 3 for detecting the light projected from the light projecting system 10 and reflected or scattered by the object, it is possible to realize a distance measuring device having excellent ranging accuracy.

According to the mobile device including the distance measuring device of the present embodiments and the movable body on which the distance measuring device is mounted, it is possible to provide a mobile device capable of controlling the mobile body with high accuracy with respect to the object.

Further, the distance measuring method of the present embodiments include a step of generating a measurement start signal for starting the distance measurement, a step of projecting light at a timing when a measurement start signal is generated and detecting light reflected or scattered by the object by a detection system, a step of measuring a time difference Δt between the timing at which the measurement start signal is generated and the timing at which the detection signal of the detection system 40 is outputted, a step of calculating a time t1 required for a signal as a source of the detection signal to pass through the wiring in the circuit of the detection system 40, a step of correcting the time difference Δt using the time t1, and a step of calculating a distance to the object based on the corrected time difference.

In this case, it is possible to calculate the distance to the object with high accuracy.

The time t1 is calculated based on the measurement result of the measurement circuit connected to the detection system 40 via the third wiring, and the time difference Δt is corrected further based on the time t2 in the step of calculating the time t2 required for the detection signal to pass through the third wiring based on the measurement result of the measurement circuit, and in the step of the correcting, the time difference Δt further based on the time t1 in the correction step.

In this case, the distance to the object can be calculated with higher accuracy.

Figure 17:
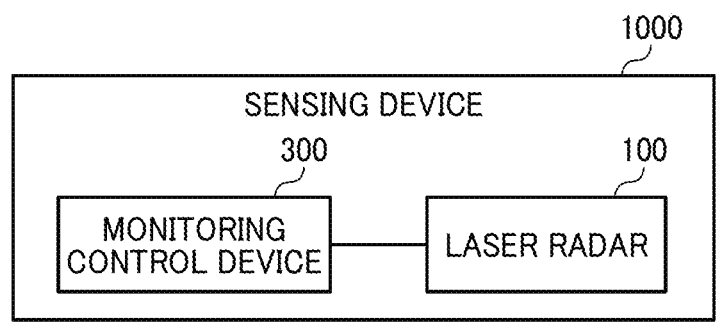
FIG. 17 is a view illustrating a sensing device.

FIG. 17 illustrates a sensing device 1000 provided with the laser radar 100. The sensing device 1000 is mounted on the mobile object and is provided with a monitoring control device 300 electrically connected to the laser radar 100 in addition to the laser radar 100. The sensing device 1000 is attached in the vicinity of a bumper or a rearview mirror of a vehicle for example. The monitoring control device 300 estimates a shape and a size of the object, calculates positional information of the object, calculates moving information, and recognizes a type of the object based on a detection result of the laser radar 100, thereby determining whether there is danger. When the monitoring control device 300 determines that there is danger, it issues a warning such as an alarm to call the mobile object operator's attention, issues an instruction to avoid danger by turning a steering wheel of the mobile object, and issues an instruction for braking to the ECU of the mobile object. Meanwhile, the sensing device 1000 is supplied with electricity from the battery of the vehicle, for example.

Meanwhile, the monitoring control device 300 can be provided integrally with the laser radar 100 or can be provided separately from the laser radar 100. The monitoring control device 300 can perform at least a part of control performed by the ECU.

In addition, the light projecting system 10 preferably includes a deflector (rotating mirror 26) that deflects light from the light source.

In addition, since the light source includes the LD, it is possible to project the pulsed light with stable output.

The sensing device 1000 described above is provided with the laser radar 100 and the monitoring control device 300, which obtains the moving information including at least one of presence of the object, a moving direction thereof, and a moving speed thereof, based on an output of the laser radar 100.

In this case, braking control and the like of the mobile object can be performed with a high degree of accuracy. The sensing device 1000 is mounted on the mobile object and the monitoring control device 300 determines whether there is danger based on at least one of the positional information and the moving information of the object. In this case, control to avoid danger of the mobile object can be performed with a high degree of accuracy.

The mobile object device provided with the sensing device 1000 and the mobile object on which the sensing device is mounted provides excellent safety.

Meanwhile, the configuration of the laser radar in the above-described embodiments and each modification can be appropriately modified.

For example, although a LD is used as the light source in the above-described embodiments and each modification, that is not a limitation. For example, an LDA in which a plurality of LDs is one-dimensionally or two-dimensionally arranged, a surface emission laser array in which a plurality of VCSELs (surface emission lasers) is one-dimensionally arranged in the sub-scanning direction, and a VCSEL array in which the VCSELs are two-dimensionally arranged can also be used.

Although the LD (end face emission laser) and the VCSEL (surface emission laser) can be used as a semiconductor laser used as the light source, it is possible to set the number of arrays to be larger with the VCSEL due to its high density integration.

The light projecting optical system can include another lens in place of or in addition to the coupling lens.

It is also possible that the light projecting optical system and the light receiving optical system do not include the reflecting mirror. That is to say, it is also possible to allow the light from the LDA to enter the rotary mirror without turning the optical path and guide the light reflected by the object and deflected by the rotary mirror to the PDA without turning the optical path.

The light receiving optical system can include another optical element (for example, a condenser mirror) in place of, or in addition to, the lens.

It is also possible to use another mirror such as a polygon mirror (rotary polygon mirror), a galvanometer mirror, and an MEMS mirror, for example, in place of the rotary mirror as the deflector.

The synchronization system may include another optical element (for example, the condenser mirror) in place of the synchronization lens.

Although the automobile is described as an example of the mobile object on which the laser radar is mounted in the above-described embodiment and each modification, the mobile object can also be a vehicle other than the automobile, an aircraft, a ship, and the like.

The specific numbers and shapes used in the description above are illustrative only and they can be appropriately changed without departing from the gist of the present disclosure.

As is clear from the description above, the laser radar of the above-described embodiment and each modification is the technology in which a so-called time of flight (TOF) method of detecting whether there is the object and detecting the distance to the object is used and is widely used in the industrial field of motion capturing technology, a range finder, and the like in addition to sensing in the mobile object. That is to say, the object detecting device of the present disclosure is not necessarily mounted on a mobile object.

Although the disclosure has been described with respect to specific embodiments for a complete and clear disclosure, the appended claims are not to be thus limited, but are to be construed as embodying all modifications and alternative constructions that can occur to one skilled in the art that fairly fall within the basic teaching set forth herein.

What is claimed is:

1. A circuit device, comprising:
   a first wiring, one end of which is connected to a signal source;
   a wiring portion having one end connected to the signal source and including at least one second wiring that generates a signal having a longer time delay than the first wiring connected to the signal source; and
   a measurement circuit, to which another end of the first wiring and another end of the second wiring are connected, to measure a transit time difference, which is a difference between a first transit time required for a signal from the signal source to pass through the first wiring and a second transit time required for the signal from the signal source to pass through the second wiring,
   wherein the measurement circuit comprises
      a reference clock generation circuit that generates a reference clock signal;
      a connection portion to connect with at least one of the other end of the first wiring and the other end of the second wiring;
      a delay circuit including at least one delay element array having a plurality of delay elements connected in series to provide a time delay to an input signal; and
      a register circuit provided corresponding to the delay element array and including at least one register that reads and holds an input signal level when the signal is input to a delay element, in synchronization with the reference clock signal,
   the measurement circuit further comprises a transit time difference calculation circuit to calculate the transit time difference from delay times of (j+1)th to i-th delay elements,
   the input signal level transits from a low potential state to a high potential state when a periodic signal output in synchronization with the reference clock signal from the signal source passes through the first wiring and is input to the delay element array, the delay element being the i-th delay element counting from an upstream side, and
   the delay element in which the input signal level changes from the low potential state to the high potential state when the periodic signal passes through the second wiring and is input to the delay element string being a j-th delay element counting from the upstream side.

2. The circuit device according to claim 1, wherein the first and second wirings are made of a same material and have different lengths.

3. The circuit device according to claim 1, wherein a period of the periodic signal input to the delay element array is shorter than a time required for the periodic signal to pass through the delay element array, and
   the measurement circuit measures the delay element and calculates a delay time of one delay element from the number of delay elements.

4. The circuit device according to claim 1, wherein the connecting portion includes a switching device to selectively connect one end of the first and second wirings to the delay element array.

5. The circuit device according to claim 1, wherein the delay circuit includes a first delay element array connected to the other end of the first wiring and a second delay element array connected to the other end of the second wiring.

6. The circuit device according to claim 1, wherein the time required for passing through the delay element array is equal to or more than a period of the reference clock signal.

7. The circuit device according to claim 1, wherein the wiring portion includes a plurality of the second wirings having different lengths, and a switch device to selectively connect any one of the other ends of the plurality of second wirings to the signal source.

8. The circuit device according to claim 1, wherein the wiring portion includes a plurality of the second wirings whose materials are partially or entirely different from each other, and a switch device to selectively connect any one of the other ends of the plurality of second wirings.

9. The circuit device according to claim 1, wherein
a measurement start signal for starting a distance measurement by a time-of-flight (TOF) method is generated by another signal source, and the other end of a third wire having one end connected to a further separate signal source to generate a detection signal by the TOF method as a measurement target signal is connectable to the measuring circuit, and
the circuit device further includes a time measuring circuit connected to the measurement circuit and configured to calculate a time difference between a timing at which the measurement start signal is generated and a timing at which the measurement target signal is input to the measurement circuit.

10. The circuit device according to claim 9, further comprising a switch device to selectively connect any one of the other ends of the first to third wirings to a delay circuit.

11. The circuit device according to claim 9, wherein the time measuring circuit is further configured to calculate a time t1 required for a signal to pass through the wiring in the further separate signal source based on the passing time difference, and correct the time difference using the time t1.

12. The circuit device according to claim 9, wherein the time measuring circuit is further configured to calculate a time t2 required for a signal to pass through the wiring connecting the further separate signal source and the measuring circuit, based on the passing time difference, and correct the time difference using the time.

13. The circuit device according to claim 9, further comprising a distance calculation circuit configured to calculate a distance to an object to which light projected at the timing at which the measurement start signal is generated, based on the output of the time measurement circuit, is irradiated.

14. A distance measurement apparatus, comprising:
the circuit device according to claim 13;
a projection system that projects light at the timing at which the measurement start signal is generated; and
a detection system as said further separate signal source for detecting the light projected from said projection system and reflected or scattered by the object.

15. A mobile device, comprising:
the distance measurement apparatus according to claim 14; and
a movable body on which the distance measuring device is mounted.

16. A circuit device, comprising:
a first wiring, one end of which is connected to a signal source;
a wiring portion having one end connected to the signal source and including at least one second wiring that generates a signal having a longer time delay than the first wiring connected to the signal source; and
a measurement circuit, to which another end of the first wiring and another end of the second wiring are connected, to measure a transit time difference, which is a difference between a first transit time required for a signal from the signal source to pass through the first wiring and a second transit time required for the signal from the signal source to pass through the second wiring,
wherein the measurement circuit comprises
a reference clock generation circuit that generates a reference clock signal;
a connection portion to connect with at least one of the other end of the first wiring and the other end of the second wiring;
a delay circuit including at least one delay element array having a plurality of delay elements connected in series to provide a time delay to an input signal; and
a register circuit provided corresponding to the delay element array and including at least one register that reads and holds an input signal level when the signal is input to the delay element, in synchronization with the reference clock signal, and
the connecting portion includes a switching device to selectively connect one end of the first and second wirings to the delay element array.

17. A circuit device, comprising:
a first wiring, one end of which is connected to a signal source;
a wiring portion having one end connected to the signal source and including at least one second wiring that generates a signal having a longer time delay than the first wiring connected to the signal source; and
a measurement circuit, to which another end of the first wiring and another end of the second wiring are connected, to measure a transit time difference, which is a difference between a first transit time required for a signal from the signal source to pass through the first wiring and a second transit time required for the signal from the signal source to pass through the second wiring,
wherein the wiring portion includes a plurality of the second wirings whose materials are partially or entirely different from each other, and a switch device to selectively connect any one of the other ends of the plurality of second wirings.

* * * * *